US012799243B2

United States Patent

(12) United States Patent
Marin et al.

(10) Patent No.: US 12,799,243 B2
(45) Date of Patent: Nov. 17, 2026

(54) SPHERICAL CATALYST COMPONENTS FOR OLEFIN POLYMERIZATION

(71) Applicant: W.R. Grace & Co.-Conn., Columbia, MD (US)

(72) Inventors: Vladimir P. Marin, Pasadena, TX (US); Ahmed Hintolay, Pasadena, TX (US)

(73) Assignee: W.R. Grace & Co.-Conn., Columbia, MD (US)

( * ) Notice: Subject to any disclaimer, the term of this patent is extended or adjusted under 35 U.S.C. 154(b) by 535 days.

(21) Appl. No.: 18/282,204

(22) PCT Filed: Mar. 8, 2022

(86) PCT No.: PCT/US2022/019384
§ 371 (c)(1),
(2) Date: Sep. 14, 2023

(87) PCT Pub. No.: WO2022/197491
PCT Pub. Date: Sep. 22, 2022

(65) Prior Publication Data

US 2024/0174776 A1 May 30, 2024

Related U.S. Application Data

(60) Provisional application No. 63/161,612, filed on Mar. 16, 2021.

(51) Int. Cl.
*C08F 4/16* (2006.01)
*B01J 35/45* (2024.01)
(Continued)

(52) U.S. Cl.
CPC ............. *C08F 110/06* (2013.01); *B01J 35/45* (2024.01); *B01J 35/51* (2024.01); *C08F 4/16* (2013.01);
(Continued)

(58) Field of Classification Search
None
See application file for complete search history.

(56) References Cited

U.S. PATENT DOCUMENTS 7,135,531 B2 * 11/2006 Zhu ........................ C08F 10/00 502/118
9,676,876 B2 6/2017 Singh et al.
(Continued)

FOREIGN PATENT DOCUMENTS

CN 103130931 B 6/2016
WO WO 2010/014320 A1 2/2010
(Continued)

OTHER PUBLICATIONS

Translation of Russian Search Report for RU Application No. 2023126221, dated Oct. 16, 2025, 2 pages.
(Continued)

*Primary Examiner* — Richard A. Huhn
(74) *Attorney, Agent, or Firm* — Dority & Manning, P.A.

(57) ABSTRACT

A process of producing a spherical catalyst component for use in producing polyolefin polymers includes dissolving a magnesium halide compound in a solvent to form a homogeneous solution, the solvent comprising an alcohol; and treating the homogeneous solution with a titanium compound in the presence of a surfactant, a supportive electron donor, and an internal electron donor to form a solid catalyst component comprising a magnesium halide compound base incorporating a titanium unit, the supportive electron donor, and the internal electron donor; wherein the catalyst component comprises particles having a substantially spherical shape and a $D_{50}$ from about 3 μm to about 150 μm.

20 Claims, 3 Drawing Sheets

(51) Int. Cl.

| | |
|---|---|
| ***B01J 35/51*** | (2024.01) |
| ***C08F 4/602*** | (2006.01) |
| ***C08F 4/614*** | (2006.01) |
| ***C08F 110/02*** | (2006.01) |
| ***C08F 110/06*** | (2006.01) |

(52) U.S. Cl.
CPC .......... *C08F 4/6028* (2013.01); *C08F 4/6143* (2013.01); *C08F 110/02* (2013.01)

(56) References Cited

U.S. PATENT DOCUMENTS

| | | | |
|---|---|---|---|
| 11,014,995 | B2 | 5/2021 | Elder et al. |
| 11,236,189 | B2 | 2/2022 | Umebayashi |
| 2005/0176900 | A1 | 8/2005 | Zhu et al. |
| 2013/0012375 | A1 | 1/2013 | Li et al. |
| 2013/0261273 | A1 | 10/2013 | Chen et al. |

FOREIGN PATENT DOCUMENTS

| | | | |
|---|---|---|---|
| WO | WO 2014/074880 | A1 | 5/2014 |
| WO | WO2015191851 | A1 | 12/2015 |
| WO | WO 2016/057634 | A1 | 4/2016 |
| WO | WO 2016/168108 | A1 | 10/2016 |
| WO | WO-2018/032744 | A1 | 2/2018 |
| WO | WO 2019/046087 | A1 | 3/2019 |
| WO | WO 2020/231716 | A1 | 11/2020 |

OTHER PUBLICATIONS

International Search Report and Written Opinion, From PCT/US2022/019384, Dated Aug. 12, 2022, 19 pages.
IN Examination Report for application 202317065643 Mailed on Aug. 21, 2026, 12 pages.

* cited by examiner

SPHERICAL CATALYST COMPONENTS FOR OLEFIN POLYMERIZATION

CROSS-REFERENCE TO RELATED APPLICATIONS

This application is a U.S. National Stage of International Patent Application No. PCT/US2022/019384, filed Mar. 8, 2022, which claims the benefit of priority to U.S. Provisional Patent Application No. 63/161,612, filed on Mar. 16, 2021, the contents of which are incorporated herein by reference in their entireties.

BACKGROUND

Polyolefins are a class of polymers derived from simple olefins. Known methods of making polyolefins include the use of Ziegler-Natta polymerization catalysts. These catalysts polymerize olefin monomers using a transition metal halide to provide a polymer with various types of stereo-chemical configurations.

One type of Ziegler-Natta catalyst system comprises a solid catalyst component, constituted by a magnesium halide compound on which are supported a titanium compound and an internal electron donor compound. In order to maintain high selectivity for an isotactic polymer product, the internal electron donor compounds are added during catalyst synthesis. The internal electron donor may be of various types. Conventionally, when a higher crystallinity of the polymer is required, an external electron donor compound is also added during the polymerization reaction.

During the past 30 years, numerous supported Ziegler-Natta catalysts have been developed which afford a much higher activity in olefin polymerization reactions and much higher content of crystalline isotactic fractions in the polymers they produce. With the development of internal and external electron donor compounds, polyolefin catalyst systems are continuously renovated.

In the past, various efforts have been made to produce spherical catalysts. For instance, a magnesium chloride and ethanol solution was fed thorough a spray crystallization process in order to produce a catalyst support having spherical properties.

In other processes, a catalyst support was formed from a magnesium compound and an alkyl silicate. The alkyl silicate was used in order to form a catalyst of relatively large size. The presence of the alkyl silicate also permitted the formation of a catalyst support while eliminating the requirement of spray drying to form the catalyst material. In order to form the catalyst support, the magnesium compound and the alkyl silicate were mixed together in a liquid medium containing an alcohol. The mixture was heated to form a catalyst support having spherical properties. In one aspect, for instance, the liquid mixture was emulsified.

In other processes, a magnesium compound and an alcohol were heated to form an adduct. The adduct was then contacted with an ether, a polymer surfactant, and an alkyl silicate in a liquid medium in order to form a catalyst support having spherical properties.

In still another past process, a solid catalyst component was produced by dissolving a halide-containing magnesium compound in a mixture including an alkyl epoxide, an organic phosphorous compound, a carboxylic acid or anhydride, and a hydrocarbon solvent to form a solution. The solution may be treated with a halogenating agent such as a titanium halide in order to form a solid precipitate.

The above processes, however, have various drawbacks and deficiencies. For instance, many of the above processes are inefficient and have not only significant energy requirements but also require multiple process steps. Consequently, a need currently exists for a catalyst component preparation process for producing a substantially spherical catalyst component in a relatively simple process. A need also exists for a substantially spherical catalyst component that has high catalyst activity and produces polyolefin polymers with excellent bulk density properties.

SUMMARY

In general, the present disclosure is directed to a spherical catalyst component that can possess high catalyst activity and can produce polyolefin polymers with relatively high bulk density and a substantially spherical morphology. The catalyst component can also demonstrate high hydrogen response and may be used in bulk phase and gas phase polymerization processes for producing all different types of polyolefin polymers, including polypropylene polymers and polyethylene polymers. Of particular advantage, the spherical catalyst component may be produced in a relatively simple precipitation process.

In one aspect, a method of producing a solid catalyst component for use in producing polyolefin polymers includes dissolving a magnesium halide compound in a solvent to form a homogeneous solution, the solvent comprising an alcohol; and treating the homogeneous solution with a first titanium compound in the presence of a surfactant, a supportive electron donor, and a first internal electron donor, to form a solid precipitate; and treating the solid precipitate with a second titanium compound in the presence a second internal donor to form the solid catalyst component comprising a magnesium halide compound base, a titanium unit, the supportive electron donor and the first and second internal electron donors; and wherein: the solid catalyst component comprises particles having an a substantially spherical shape and exhibiting a D50 from about 3 μm to about 150 μm.

In one aspect, a method of producing a solid catalyst component for use in producing polyolefin polymers includes dissolving a magnesium halide compound in a solvent to form a homogeneous solution, the solvent comprising an alcohol; treating the homogeneous solution with a first titanium compound in the presence of a surfactant and a supportive electron donor to form a solid precipitate comprising a solid catalyst component comprising a magnesium halide compound base, a titanium unit, and the supportive electron donor; and wherein: the solid catalyst component comprises particles having an a substantially spherical shape and exhibiting a D50 from about 3 μm to about 150 μm.

In one aspect, a method of producing a solid catalyst component for use in producing polyolefin polymers includes dissolving a magnesium halide compound in a solvent to form a homogeneous solution, the solvent comprising an alcohol; and treating the homogeneous solution with a first titanium compound in the presence of a surfactant, a supportive electron donor, and a first internal electron donor, to form a solid precipitate; and wherein: the solid precipitate comprising the solid catalyst component comprises a magnesium halide compound base, a titanium unit, the supportive electron donor, and the first internal electron donor; and the solid catalyst component comprises particles having an a substantially spherical shape and exhibiting a D50 from about 3 μm to about 150 μm.

In one aspect, a method of producing a solid catalyst component for use in producing polyolefin polymers includes dissolving a magnesium halide compound in a solvent to form a homogeneous solution, the solvent comprising an alcohol; and treating the homogeneous solution with a first titanium compound in the presence of a surfactant and a supportive electron donor to form a solid precipitate; and treating the solid precipitate with a second titanium compound in the presence a second internal donor; to form the solid catalyst component comprising a magnesium halide compound base, a titanium unit, the supportive electron donor, and the second internal electron donor; and wherein: the solid catalyst component comprises particles having an a substantially spherical shape and exhibiting a D50 from about 3 μm to about 150 μm.

In one aspect, a method is provided for producing a spherical catalyst component for use in producing polyolefin polymers. The method includes dissolving a magnesium halide compound in a solvent to form a catalyst solution. The solvent comprises an alcohol, such as ethanol. A titanium compound may then be added to the catalyst solution in the presence of a surfactant, a supportive electron donor, and an internal electron donor. A catalyst component is then precipitated from the catalyst solution. The magnesium halide compound may be represented as $Mg(OR^{30})_nCl_{2-n}$, wherein $R^{30}$ is alkyl or haloalkyl, and n is 0 or 1. The catalyst component includes a magnesium halide compound base incorporating a titanium compound or unit, and the supportive donor. A optionally, an internal electron donor. The catalyst component comprises particles having an average particle size of from about 3 microns to about 150 microns on a volume basis. The particles are also substantially spherical. For instance, the particles can have a B/L3 value of greater than 0.75.

In one aspect, the magnesium halide compound is magnesium chloride. The alcohol may be a C2 to C20 alcohol, such as 2-ethyl hexanol. In one aspect, the precipitation can also be conducted in the presence of a hydrocarbon solvent, an aromatic solvent, or a mixture thereof. For example, the precipitation may be conducted in the presence of a dialkylether having a C1 to C12 carbon chain. The surfactant present in the catalyst solution, on the other hand, may be an acrylate or a polyacrylate. The precipitation may be conducted in the presence of a silicon compound, As described above, an internal electron donor may be added to the catalyst solution. One or more internal electron donors may be added to the catalyst solution prior to, during, or after the catalyst component has precipitated. In general, any suitable internal electron donor may be used. In one aspect, the internal electron donor may be an aryl diester. Alternatively, the internal electron donor can comprise a diether, a succinate, an organic acid ester, a polycarboxylic acid ester, a polyhydroxy ester, a heterocyclic polycarboxylic acid ester, an inorganic acid ester, an alicyclic polycarboxylic acid ester, a hydroxy-substituted carboxylic acid ester compound having 2 to 30 carbon atoms, a compound having at least one ether group and at least one ketone group, or mixtures thereof.

In any of the above embodiments, the internal electron donor may be represented by the following formula:

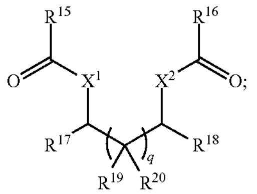

wherein: $X^1$ and $X^2$ are each O, S, or $NR^{47}$; each of $R^{15}$ through $R^{20}$ are independently H, a heteroatom, alkyl, cycloalkyl, cycloalkylalkyl, aryl, aralkyl, heterocyclyl, heterocyclylalkyl, heteroaryl, or heteroarylalkyl; and q is an integer from 0 to 12. In some embodiments, each of $R^{15}$ through $R^{20}$ are independently F, Cl, Br, I, $NR_2^{46}$, $SiR^{80}_3$, alkyl, cycloalkyl, cycloalkylalkyl, aryl, aralkyl, heterocyclyl, heterocyclylalkyl, heteroaryl, or heteroarylalkyl; q is an integer from 0 to 12, each $R^{46}$ is independently selected from H, $C_1$-$C_{20}$ alkyl, $C_6$-$C_{20}$ aryl or alkylaryl; and $R^{47}$ is H, $C_1$-$C_{20}$ alkyl, $C_6$-$C_{20}$ aryl, $C_6$-$C_{20}$ aralkyl. Each $R^{80}$ is individually alkyl, cycloalkyl, alkoxy, cycloalkylalkyl, aryl, aralkyl, heterocyclyl, heterocyclylalkyl, heteroaryl, or heteroarylalkyl.

In one particular aspect, the internal electron donor is represented by one or more of the following formulae:

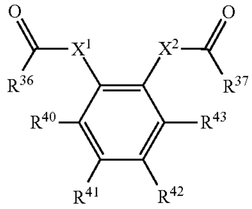

where $R^{40}$-$R^{43}$, are each independently selected from H, a heteroatom, alkyl, cycloalkyl, cycloalkylalkyl, aryl, aralkyl, alkylaryl, or an —$OR^{44}$ where $R^{44}$ is $C_1$-$C_{20}$ alkyl, $C_6$-$C_{20}$ aryl, $C_6$-$C_{20}$ aralkyl, or $C_6$-$C_{20}$ alkylaryl; $R^{36}$ and $R^{37}$ are each independently selected from F, Cl, Br, I, alkyl, cycloalkyl, cycloalkylalkyl, aryl, aralkyl, alkylaryl, —$OR^{45}$, or —$NR_2^{46}$; $R^{45}$ is $C_1$-$C_{20}$ alkyl, $C_6$-$C_{20}$ aryl, or alkylaryl; $X^1$ and $X^2$ are each O, S, or $NR^{47}$; $R^{46}$ is H, $C_1$-$C_{20}$ alkyl, $C_6$-$C_{20}$ aryl, $C_6$-$C_{20}$ aralkyl; and $R^{47}$ is H, $C_1$-$C_{20}$ alkyl, $C_6$-$C_{20}$ aryl, $C_6$-$C_{20}$ aralkyl; or

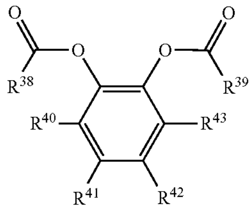

wherein: $R^{38}$, $R^{39}$, $R^{40}$, $R^{41}$, $R^{42}$, and $R^{43}$ are each independently H, a heteroatom, alkyl, cycloalkyl, cycloalkylalkyl, aryl, alkylaryl, heterocyclyl, heterocyclylalkyl, heteroaryl, or heteroarylalkyl; or

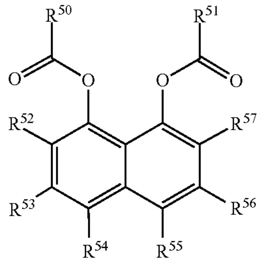

wherein: each of $R^{50}$ through $R^{57}$ are independently H, a heteroatom, alkyl, cycloalkyl, cycloalkylalkyl, aryl, aralkyl, heterocyclyl, heterocyclylalkyl, heteroaryl, or heteroarylalkyl.

In general, the resulting catalyst component can contain the internal electron donor in an amount of from about 1% to about 20% by weight.

In addition to one or more internal electron donors, the catalyst component is also formed in the presence of a supportive electron donor. In one aspect, the supportive electron donor can comprise a mono-aryl ester. In one aspect, the supportive electron donor has the following formula:

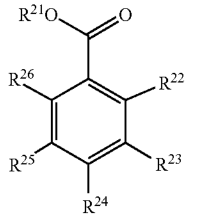

wherein $R^{21}$ is alkyl, cycloalkyl, or aryl having from 1 to 20 carbon atoms, a heteroatom, or a combination thereof; wherein each of $R^{22}$-$R^{26}$ is independently H, alkyl, cycloalkyl, or aryl having from 1 to 20 carbon atoms, heteroatom, or a combination of any two or more thereof. In one particular embodiment, the supportive electron donor comprises ethylbenzoate. In some embodiments, the supportive and internal donors are the same.

In general, the catalyst component may contain the supportive electron donor in an amount of about 0.1 wt % to about 15 wt %. This includes from about 0.1 wt % to about 10 wt %, about 0.1 wt % to about 5 wt %, about 0.5 wt % to about 15 wt %, about 0.5 wt % to about 10 wt %, about 0.5 wt % to about 5 wt %, or about 1 wt % to about 5 wt %.

In addition to an internal electron donor and a supportive electron donor, the catalyst component may also be formed in the presence of an organosilicon compound. The organosilicon compound can contain Si—O groups, O—Si—O groups, or mixtures thereof. In one aspect, the organosilicon compound is a silane. For example, the organosilicon compound may be compounds having the following chemical structure:

$$R^{27}{}_{n}Si(OR^{28})_{4-n}$$

or a polysiloxane, or a mixture of any two or more thereof, wherein: each $R^{27}$ is H, a alkyl, cycloalkyl, aryl, aralkyl, or alkaryl; each $R^{28}$ is H, a alkyl, cycloalkyl, aryl, aralkyl, alkaryl, or a group of formula $—SiR^{27'}n'(OR^{28'})_{3-n'}$; each $R^{27'}$ is H, a alkyl, cycloalkyl, aryl, aralkyl, or alkaryl; each $R^{28'}$ is H, a alkyl, cycloalkyl, aryl, aralkyl, alkaryl, or a group of formula $R^{27'}n'Si(OR^{28'})_{3-n'}$; n is 0, 1, 2, or 3; and n' is 0, 1, 2, or 3. Other illustrative organosilicon compounds include polysiloxanes.

In some embodiments, a spherical catalyst component may be produced having an average particle size of from about 5 microns to about 150 microns, such as from about 5 microns to about 75 microns. The sphericity of the catalyst component may be characterized by an aspect ratio of B/L3 from about 0.8 to about 1.0. The catalyst component may be combined with other components for producing a catalyst system. For example, the catalyst system in accordance with the present disclosure can include the spherical catalyst component combined with a co-catalyst and at least one external electron donor. The at least one external electron donor can comprise an activity limiting agent, a selectively control agent, or mixtures thereof.

Also provided for herein, is a polyolefin polymer made using the catalyst component and to a process for producing a polyolefin polymer using the catalyst component as described. For example, in one aspect, the present disclosure is directed to a polymer composition comprising polyolefin particles. The polyolefin particles comprise a Ziegler-Natta catalyzed polyolefin. The polyolefin particles can have an aspect ratio of b/l3 of greater than 0.85 and a D50 particle size of from about 200 microns to about 3000 microns. The polyolefin particles can have a bulk density of greater than about 0.36 g/cc, such as greater than about 0.38 g/cc, such as greater than about 0.40 g/cc, such as greater than about 0.42 g/cc, such as greater than about 0.44 g/cc.

Other features and aspects of the present disclosure are discussed in greater detail below.

DETAILED DESCRIPTION

Figure 1:
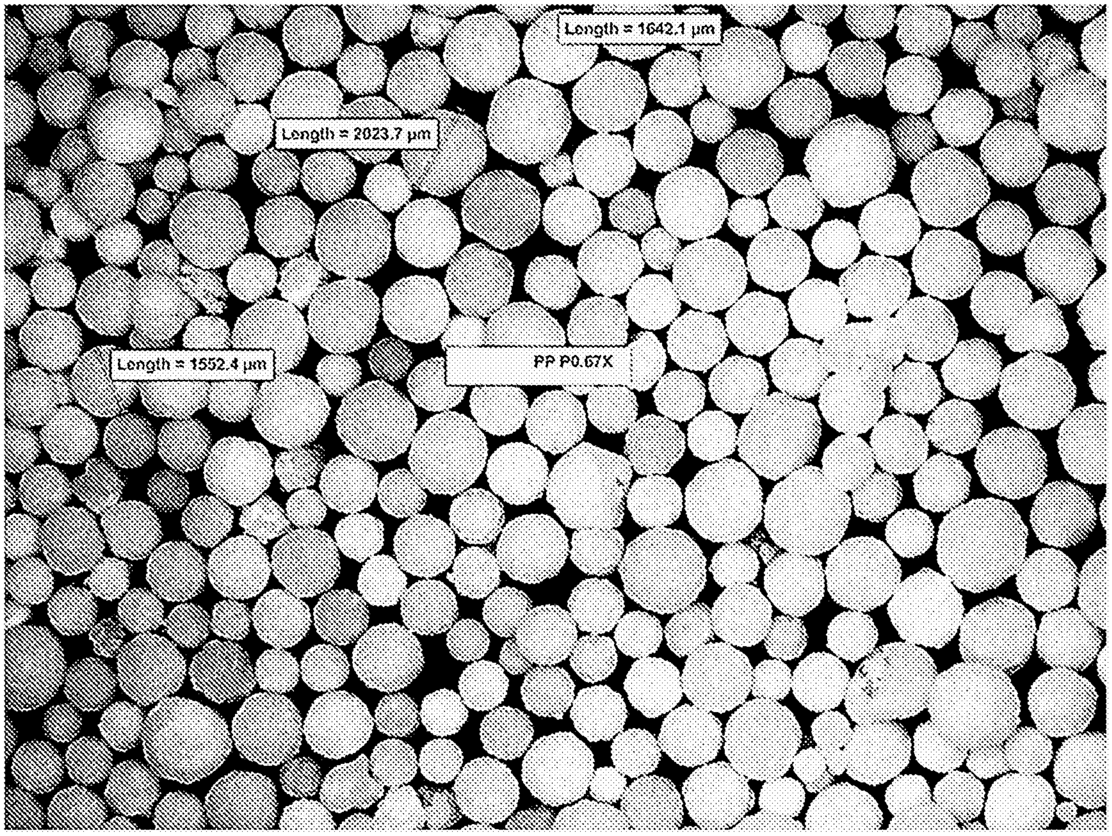
FIG. 1 is an SEM image of polypropylene particles produced in Example 9.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and may be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

In general, "substituted" refers to an alkyl, alkenyl, aryl, or ether group, as defined below (e.g., an alkyl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group will be substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, alkynoxy, aryloxy, aralkyloxy, heterocyclyloxy, and heterocyclylalkoxy groups; carbonyls (oxo); carboxyls; esters; urethanes; oximes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; nitriles (i.e., CN); and the like.

As used herein, "alkyl" groups include straight chain and branched alkyl groups having from 1 to about 20 carbon atoms, and typically from 1 to 12 carbons or, in some embodiments, from 1 to 8 carbon atoms. As employed herein, "alkyl groups" include cycloalkyl groups as defined below. Alkyl groups may be substituted or unsubstituted. An alkyl group may be substituted one or more times. An alkyl group may be substituted two or more times. Examples of straight chain alkyl groups include methyl, ethyl, n-propyl, n-butyl, n-pentyl, n-hexyl, n-heptyl, and n-octyl groups. Examples of branched alkyl groups include, but are not limited to, isopropyl, sec-butyl, t-butyl, neopentyl, isopentyl groups, and 1-cyclopentyl-4-methylpentyl. Representative substituted alkyl groups may be substituted one or more times with, for example, amino, thio, hydroxy, cyano, alkoxy, and/or halo groups such as F, Cl, Br, and I groups. As used herein the term haloalkyl is an alkyl group having one or more halo groups. In some embodiments, haloalkyl refers to a per-haloalkyl group.

Cycloalkyl groups are cyclic alkyl groups such as, but not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments the number of ring carbon atoms range from 3 to 5, 6, or 7. Cycloalkyl groups may be substituted or unsubstituted. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined above. Representative substituted cycloalkyl groups may be mono-substituted or substituted more than once, such as, but not limited to: 2,2-; 2,3-; 2,4-; 2,5-; or 2,6-disubstituted cyclohexyl groups or mono-, di-, or tri-substituted norbornyl or cycloheptyl groups, which may be substituted with, for example, alkyl, alkoxy, amino, thio, hydroxy, cyano, and/or halo groups.

Alkenyl groups are straight chain, branched or cyclic alkyl groups having 2 to about 20 carbon atoms, and further including at least one double bond. In some embodiments alkenyl groups have from 1 to 12 carbons, or, typically, from 1 to 8 carbon atoms. Alkenyl groups may be substituted or unsubstituted. Alkenyl groups include, for instance, vinyl, propenyl, 2-butenyl, 3-butenyl, isobutenyl, cyclohexenyl, cyclopentenyl, cyclohexadienyl, butadienyl, pentadienyl, and hexadienyl groups among others. Alkenyl groups may be substituted similarly to alkyl groups. Divalent alkenyl groups, i.e., alkenyl groups with two points of attachment, include, but are not limited to, $CH—CH{=}CH_2$, $C{=}CH_2$, or $C{=}CHCH_3$.

As used herein, "aryl", or "aromatic," groups are cyclic aromatic hydrocarbons that do not contain heteroatoms. Aryl groups include monocyclic, bicyclic and polycyclic ring systems. Thus, aryl groups include, but are not limited to, phenyl, azulenyl, heptalenyl, biphenylenyl, indacenyl, fluorenyl, phenanthrenyl, triphenylenyl, pyrenyl, naphthacenyl, chrysenyl, biphenyl, anthouracenyl, indenyl, indanyl, pentalenyl, and naphthyl groups. An aryl group with one or more alkyl groups may also be referred to as alkaryl groups. In some embodiments, aryl groups contain 6-14 carbons, and in others from 6 to 12 or even 6-10 carbon atoms in the ring portions of the groups. The phrase "aryl groups" includes groups containing fused rings, such as fused aromatic-aliphatic ring systems (e.g., indanyl, tetrahydronaphthyl, and the like). Aryl groups may be substituted or unsubstituted.

Heterocyclyl or heterocycle refers to both aromatic and nonaromatic ring compounds including monocyclic, bicyclic, and polycyclic ring compounds containing 3 or more ring members of which one or more is a heteroatom such as, but not limited to, N, O, and S. Examples of heterocyclyl groups include, but are not limited to: unsaturated 3 to 8 membered rings containing 1 to 4 nitrogen atoms such as, but not limited to pyrrolyl, pyrrolinyl, imidazolyl, pyrazolyl, pyridinyl, dihydropyridinyl, pyrimidinyl, pyrazinyl, pyridazinyl, triazolyl (e.g. 4H-1,2,4-triazolyl, 1H-1,2,3-triazolyl, 2H-1,2,3-triazolyl etc.), tetrazolyl, (e.g. 1H-tetrazolyl, 2H tetrazolyl, etc.); saturated 3 to 8 membered rings containing 1 to 4 nitrogen atoms such as, but not limited to, pyrrolidinyl, imidazolidinyl, piperidinyl, piperazinyl; condensed unsaturated heterocyclic groups containing 1 to 4 nitrogen atoms such as, but not limited to, indolyl, isoindolyl, indolinyl, indolizinyl, benzimidazolyl, quinolyl, isoquinolyl, indazolyl, benzotriazolyl; unsaturated 3 to 8 membered rings containing 1 to 2 oxygen atoms and 1 to 3 nitrogen atoms such as, but not limited to, oxazolyl, isoxazolyl, oxadiazolyl (e.g. 1,2,4-oxadiazolyl, 1,3,4-oxadiazolyl, 1,2,5-oxadiazolyl, etc.); saturated 3 to 8 membered rings containing 1 to 2 oxygen atoms and 1 to 3 nitrogen atoms such as, but not limited to, morpholinyl; unsaturated condensed heterocyclic groups containing 1 to 2 oxygen atoms and 1 to 3 nitrogen atoms, for example, benzoxazolyl, benzoxadiazolyl, benzoxazinyl (e.g. 2H-1,4-benzoxazinyl etc.); unsaturated 3 to 8 membered rings containing 1 to 3 sulfur atoms and 1 to 3 nitrogen atoms such as, but not limited to, thiazolyl, isothiazolyl, thiadiazolyl (e.g. 1,2,3-thiadiazolyl, 1,2,4-thiadiazolyl, 1,3,4-thiadiazolyl, 1,2,5-thiadiazolyl, etc.); saturated 3 to 8 membered rings containing 1 to 2 sulfur atoms and 1 to 3 nitrogen atoms such as, but not limited to, thiazolodinyl; saturated and unsaturated 3 to 8 membered rings containing 1 to 2 sulfur atoms such as, but not limited to, thienyl, dihydrodithiinyl, dihydrodithionyl, tetrahydrothiophene, tetrahydrothiopyran; unsaturated condensed heterocyclic rings containing 1 to 2 sulfur atoms and 1 to 3 nitrogen atoms such as, but not limited to, benzothiazolyl, benzothiadiazolyl, benzothiazinyl (e.g. 2H-1,4-benzothiazinyl, etc.), dihydrobenzothiazinyl (e.g. 2H-3,4-dihydrobenzothiazinyl, etc.), unsaturated 3 to 8 membered rings containing oxygen atoms such as, but not limited to furyl; unsaturated condensed heterocyclic rings containing 1 to 2 oxygen atoms such as benzodioxolyl (e.g., 1,3-benzodioxoyl, etc.); unsaturated 3 to 8 membered rings containing an oxygen atom and 1 to 2 sulfur atoms such as, but not limited to, dihydrooxathiinyl; saturated 3 to 8 membered rings containing 1 to 2 oxygen atoms and 1 to 2 sulfur atoms such as 1,4-oxathiane; unsaturated condensed rings containing 1 to 2 sulfur atoms such as benzothienyl, benzodithiinyl; and unsaturated condensed heterocyclic rings containing an oxygen atom and 1 to 2 oxygen atoms such as benzoxathiinyl. Heterocyclyl group also include those described above in which one or more S atoms in the ring is double-bonded to one or two oxygen atoms (sulfoxides and sulfones). For example, heterocyclyl groups include tetrahydrothiophene oxide and tetrahydrothiophene 1,1-dioxide. Typical heterocyclyl groups contain 5 or 6 ring members. Thus, for example, heterocyclyl groups include morpholinyl, piperazinyl, piperidinyl, pyrrolidinyl, imidazolyl, pyrazolyl, 1,2,3-triazolyl, 1,2,4-triazolyl, tetrazolyl, thiophenyl, thiomorpholinyl, thiomorpholinyl in which the S atom of the thiomorpholinyl is bonded to one or more O atoms, pyrrolyl, pyridinyl, homopiperazinyl, oxazolidin-2-onyl, pyrrolidin-2-onyl, oxazolyl, quinuclidinyl, thiazolyl, isoxazolyl, furanyl, dibenzylfuranyl, and tetrahydrofuranyl. Heterocyclyl or heterocycles may be substituted.

Heteroaryl groups are aromatic ring compounds containing 5 or more ring members, of which, one or more is a heteroatom such as, but not limited to, N, O, and S. Heteroaryl groups include, but are not limited to, groups such as pyrrolyl, pyrazolyl, triazolyl, tetrazolyl, oxazolyl, isoxazolyl, thiazolyl, pyridinyl, pyridazinyl, pyrimidinyl, pyrazinyl, thiophenyl, benzothiophenyl, furanyl, benzofuranyl, dibenzofuranyl, indolyl, azaindolyl (pyrrolopyridinyl), indazolyl, benzimidazolyl, imidazopyridinyl (azabenzimidazolyl), pyrazolopyridinyl, triazolopyridinyl, benzotriazolyl, benzoxazolyl, benzothiazolyl, benzothiadiazolyl, imidazopyridinyl, isoxazolopyridinyl, thianaphthyl, purinyl, xanthinyl, adeninyl, guaninyl, quinolinyl, isoquinolinyl, tetrahydroquinolinyl, quinoxalinyl, and quinazolinyl groups. Heteroaryl groups include fused ring compounds in which all rings are aromatic such as indolyl groups and include fused ring compounds in which only one of the rings is aromatic, such as 2,3-dihydro indolyl groups. Although the phrase "heteroaryl groups" includes fused ring compounds, the phrase does not include heteroaryl groups that have other groups bonded to one of the ring members, such as alkyl groups. Rather, heteroaryl groups with such substitution are referred to as "substituted heteroaryl groups." Representative substituted heteroaryl groups may be substituted one or more times with various substituents such as those listed above.

As used herein, the term "hydrocarbyl" and "hydrocarbon" refer to substituents containing only hydrogen and carbon atoms, including branched or unbranched, saturated or unsaturated, cyclic, polycyclic, fused, or acyclic species, and combinations thereof. Non-limiting examples of hydrocarbyl groups include alkyl-, cycloalkyl-, alkenyl-, 475 alkadienyl-, cycloalkenyl-, cycloalkadienyl-, aryl-, aralkyl, alkylaryl, and alkynyl-groups.

As used herein, the terms "substituted hydrocarbyl" and "substituted hydrocarbon" refer to a hydrocarbyl group that is substituted with one or more nonhydrocarbyl substituent groups. A Non-limiting example of a nonhydrocarbyl substituent 480 group is a heteroatom. As used herein, a "heteroatom" refers to an atom other than carbon or hydrogen. The heteroatom can be a non-carbon atom from Groups IV, V, VI, and VII of the Periodic Table. Non-limiting examples of heteroatoms include: halogens (F, Cl, Br, I), N, O, P, B, S, and Si. A substituted hydrocarbyl group also includes a halohydrocarbyl group and a silicon-containing hydrocarbyl group. As used herein, the term "halohydrocarbyl" group refers to a hydrocarbyl group that is substituted with one or more halogen atoms. As used herein, the term "silicon-containing hydrocarbyl group" is a hydrocarbyl group that is substituted with one or more silicon atoms. The silicon atom(s) may or may not be in the carbon chain.

As used herein, the prefix "halo" refers to a halogen (i.e. F, Cl, Br, or I) being attached to the group being modified by the "halo" prefix. For example, haloaryls are halogenated aryl groups.

Groups described herein having two or more points of attachment (i.e., divalent, trivalent, or polyvalent) within the compound of the present technology are designated by use of the suffix, "ene." For example, divalent alkyl groups are alkylene groups, divalent aryl groups are arylene groups, divalent heteroaryl groups are divalent heteroarylene groups, and so forth.

In general, the present disclosure is directed to catalyst systems for producing polyolefin polymers, particularly polypropylene polymers. The present disclosure is also directed to methods of polymerizing and copolymerizing olefins using the catalyst system.

More particularly, the present disclosure is directed to a method of producing a catalyst component for use in a Ziegler-Natta catalyst system that is comprised of spherical particles. Of particular advantage, the spherical catalyst component may be produced in a one-step process. In particular, a magnesium halide compound is dissolved in a solvent and the catalyst component is precipitated from the solution in the presence of a surfactant, a supportive electron donor, and one or more internal electron donors. The precipitated particles are not only spherical in shape but can have an average particle size of from about 5 microns to about 150 microns, such as from about 5 microns to about 70 microns. When contained in a catalyst system, the catalyst component of the present disclosure shows high catalyst activity and the ability to produce polyolefin polymers with excellent bulk density characteristics. In addition, the catalyst system demonstrates high hydrogen response.

The catalyst system of the present disclosure containing the spherical catalyst component is also very versatile. For instance, the catalyst system may be used in bulk polymerization processes and in gas phase polymerization processes. The catalyst system may also be used to produce polypropylene polymers and polyethylene polymers.

In general, the method of producing the spherical catalyst component includes first dissolving a magnesium halide compound in a solvent. The magnesium halide compound, for instance, may be magnesium chloride. The solvent may be an alcohol alone or in combination with a hydrocarbon solvent. The solvent may be heated to a temperature of from about 30° C. to about 145° C., such as from about 50° C. to about 140° C. during contact with the magnesium halide compound.

After the magnesium halide compound solution is formed, a first titanium halide compound is added to the solution. The first titanium halide may be added to the solution at a relatively low temperature, such as at a temperature less than about 20° C. In one aspect, the temperature may be from about −30° C. to about 0° C. In addition to the first titanium halide compound, a surfactant and a supportive electron donor may be added. In addition, a diether and a silicon compound can also be added to the solution.

However, it is to be noted that the sequence of the reagent addition may be varied. In some embodiments, the supportive electron donor, the surfactant, or/and diether may be added before or after the first titanium halide addition, and at a temperature from about −30° C. to about 50° C. In other embodiments, the supportive electron donor, the surfactant, or ether may be added during the dissolving of the magnesium halide compound in the alcohol.

After the first titanium compound is added to the mixture, an oil phase emulsion is formed. Heating of the oil phase emulsion causes a solid precipitate to form. The oil phase emulsion may be heated to a temperature of from about 0° C. to about 110° C., such as from about 50° C. to about 100° C. During the process, one or more internal electron donors are added and incorporated into the catalyst component. The internal electron donors may be added prior to the precipitation, during precipitation, and/or after precipitation.

In some embodiments, the solid precipitate may also be treated with a second titanium halide at temperature from 50° C. to 150° C. The first and the second titanium halide may be the same or different. In addition, a further internal donor, as described above, may be added during the second titanium halide treatment. The further internal donor may be a single material as described above, or a mixture of internal donors.

The solid catalyst component may be isolated from the reaction, washed with an organic solvent (preferable hydrocarbons) and dried. The washed, solid catalyst component includes a magnesium halide compound base, titanium, the supportive electron donor, and the internal electron donor. The solid catalyst component that is formed is substantially spherical.

The catalyst component generally exhibits an average particle size of greater than about 5 microns, such as greater than about 10 microns, such as greater than about 20 microns, such as greater than about 30 microns, such as greater than about 40 microns. The average particle size of the catalyst component particles can generally be less than about 150 microns, such as less than about 90 microns, such as less than about 80 microns, such as less than about 70 microns. As described above, the particles may be substantially spherical. For instance, the polymer particles can have a B/L3 of greater than about 0.7, such as greater than about 0.75, such as greater than about 0.8, such as even greater than about 0.85 and generally less than 1. Due to the particle morphology, polymer resins made according to the present disclosure can also have increased bulk density, spherical particle morphology, and thus good flow properties. The bulk density of the polymer particles, for instance, may be greater than about 0.36 g/cc, such as greater than about 0.38 g/cc, such as greater than about 0.4 g/cc. The bulk density is generally less than about 0.8 g/cc.

In addition to bulk density, polymer resins made according to the present disclosure can also have other improved morphological characteristics. Polymer morphology characteristics include, for instance, average particle size, particle size distribution, particle shape, and surface texture. Catalyst morphology characteristics can directly influence the morphology of polymer particles produced from the catalyst. Polyolefin polymers made from the solid catalyst component, for instance, may be produced having substantially spherical particles that display an optimum particle size and a relatively narrow particle size distribution. Due to the improved polymer morphology, the polymer particles are much easier to handle. The polymer particles have excellent flow properties and are easy to process. For instance, the polymer particles are easier to remove from the reactor, easier to transport, and are easier to package and ship. In addition, the improved particle properties also prevent against fouling within the reactor equipment.

As described above, the method of producing the spherical catalyst component of the present disclosure includes first dissolving a magnesium halide compound in a solvent. The magnesium halide compound, for instance, may be magnesium chloride. In one aspect, the solvent may be an alcohol. For instance, the alcohol may be a C2 to C20 alcohol that is linear or branched. In one aspect, a C2 to C8 alcohol is used. In still another aspect, a mixture of alcohols may be used to form the solvent. For instance, in one embodiment, the solvent can comprise ethanol alone or in combination with an alcohol with a carbon chain length of greater than 3 carbon atoms. In another embodiment, the solvent comprises 2-ethyl-hexanol.

In addition to one or more alcohols, the solvent can also contain one or more other solvents. The other solvents may be present initially or added later when the magnesium halide compound is combined with a titanium compound. The one or more other solvents can include hydrocarbon solvents, aromatic solvents, and mixtures thereof.

Illustrative aromatic solvents that may be used include chlorinated aromatic compounds. In one aspect, for instance, the aromatic solvent may be chlorobenzene. Once the magnesium halide compound is combined with one or more solvents, the solution can generally be heated to a temperature of greater than about 50° C., such as greater than about 60° C., such as greater than about 70° C., such as greater 80° C., and generally less than about 150° C., such as less than about 130° C., such as less than about 110° C., such as less than about 100° C. A homogeneous solution may be formed. The magnesium halide compound, such as magnesium chloride, may be present in the solution in an amount greater than about 5% by weight, such as greater than about 7% by weight, such as greater than about 10% by weight, such as greater than about 12% by weight, and generally less than about 20% by weight, such as less than about 17% by weight, such as less than about 15% by weight, such as less than about 12% by weight.

Next, a first titanium compound, particularly a titanium halide compound, is add to the solution. More particularly, the resulting solution may be treated with a titanium compound in the presence of an organosilicon compound, a supportive electron donor, and internal electron donor to form a solid precipitate. The titanium compound used to form the catalyst can have the following chemical formula: $Ti(OR^{29})_gX^3_{4-g}$ where each $R^{29}$ is independently a $C_1$-$C_{20}$ alkyl, $C_3$-$C_{20}$ cycloalkyl, or $C_6$-$C_{30}$ aryl; $X^3$ is Br, Cl, or I; and g is 0, 1, 2, 3, or 4. These same titanium compounds may also be added in subsequent steps of the process, as described herein.

Illustrative titanium compounds include, but are not limited to, a titanium alkoxide, titanium tetrabromide, titanium tetrachloride, titanium trichloride, or mixtures thereof.

The process of producing the spherical catalyst component can occur in the absence of various components. For instance, the process can occur in the absence of epoxy compounds. In addition, the process can occur in the absence in phosphorus compounds. The absence of the above components not only makes the process more efficient but can also provide various advantages in the resulting product.

The magnesium halide compound solution is contacted with the first titanium halide compound generally at a lower temperature. For example, the temperature may be less than about 10° C., such as less than about 0° C., such as less than about −5° C., such as less than about −10° C., and generally greater than about −30° C., such as greater than about −20° C. The titanium halide compound contacts the magnesium halide compound solution in a process known as halogenation, which causes the spherical catalyst component to precipitate.

Halogenation includes contacting the catalyst component with a halogenating agent in the presence of the supportive electron donor and/or internal electron donor. Halogenation converts the magnesium moiety present in the catalyst component into a magnesium halide compound support upon which the titanium moiety (such as a titanium halide) is deposited. Not wishing to be bound by any particular theory, it is believed that during halogenation the supportive and/or the internal electron donor (1) regulates the position of titanium on the magnesium-based support, (2) facilitates conversion of the magnesium and titanium moieties into respective halides and (3) regulates the crystallite size of the magnesium halide compound support during conversion.

A second titanium halide may be added to the process after the precipitate is formed. The second titanium compound may be the same as the first or different. Generally, the second titanium compound is added at temperature greater than 50° C. For example, the temperature may be greater than 80° C., or greater than 100° C. The internal donor may be added during the second titanium compound treatment.

As described above, at least one internal electron donor is present during the synthesis of the catalyst component. An internal electron donor is a compound added or otherwise formed during formation of the catalyst composition that donates at least one pair of electrons to one or more metals present in the resultant catalyst support. In one embodiment, at least two internal electron donors are present during the synthesis of the catalyst component. A supportive donor may also be present. The supportive donor is a reagent added in the support synthesis and/or formed during the process of constructing the catalyst that binds to the magnesium surface and remains in the catalyst support, similar to the internal electron donor. The supportive donor is usually smaller (less bulky) and produces a weaker coordination with the catalyst support than the internal electron donor. In this regard, although unknown, it is believed that the supportive donor is partially removed from the catalyst support when contacted with an activation agent such as an aluminum compound. The supportive donor is believed to be preferentially removed from the catalyst support during activation in a manner that maintains greater amounts of other internal electron donors within the catalyst composition. For instance, the supportive donor may be used to maintain greater amounts of the internal electron donor.

Thus, the supportive donor operates like an internal electron donor but is removed from the catalyst support in greater amounts during activation of the catalyst in comparison to the internal electron donor. In this manner, the supportive donor is a secondary internal electron donor that protects the primary internal electron donor. Further, it is believed that the supportive donor is incorporated into the catalyst support during synthesis and later partially removed from the catalyst support without in any way affecting the metals contained in the catalyst support. It is believed that during the activation of the catalyst component with an alkyl aluminum, the supportive electron donor is at least partially replaced by an external electron donor, such as $R^{27}{}_{n}Si(OR^{28})_{4-n}$ wherein: each $R^{27}$ is H, a alkyl, cycloalkyl, aryl, aralkyl, or alkaryl; each $R^{28}$ is H, a alkyl, cycloalkyl, aryl, aralkyl, alkaryl, or a group of formula —$SiR^{27'}n'(OR^{28'})_{3-n'}$; each $R^{27'}$ is H, a alkyl, cycloalkyl, aryl, aralkyl, or alkaryl; each $R^{28'}$ is H, a alkyl, cycloalkyl, aryl, aralkyl, alkaryl, or a group of formula $R^{27'}n'Si(OR^{28'})_{3-n'}$; n is 0, 1, 2, or 3; and n' is 0, 1, 2, or 3, resulting in an active catalyst component that is stable over a long period of time.

In some embodiments, the catalyst component may be prepared without an internal donor and the catalyst component incorporates only the supportive donor and the supportive donor may serve as internal donor in polymerization process.

The catalyst component morphology and catalyst performance are sufficiently controlled by addition the different ingredients added to the magnesium halide compound solution and optionally added after precipitation. For instance, as described above, the magnesium halide compound solution may be combined with a titanium halide in combination with a surfactant, a supportive electron donor, an internal electron donor, and optionally a silicon compound and/or a diether. Adding the above ingredients to the magnesium halide compound solution produces an oil phase emulsion. Oil phase droplets are formed within the emulsion that then precipitate during heating. For instance, as described above, the titanium compound or halogenating agent is contacted with the magnesium halide compound solution initially at a temperature of less than about 0° C. As the other components are added, such as the supportive electron donor, the mixture is then heated at a rate of 0.1 to 10.0° C./minute, or at a rate of 1.0 to 5.0° C./minute. The internal electron donor may be added initially and/or later, after an initial contact period between the halogenating agent and catalyst component. Temperatures for the halogenation are from 0° C. to 100° C. (or any value or subrange therebetween).

In one embodiment, the catalyst component, the supportive electron donor, the internal electron donor, and the halogenating agent are added simultaneously or substantially simultaneously. The halogenation procedure may be repeated one, two, three, or more times as desired.

The titanium halide compound, supportive electron donor, and internal electron donor are contacted with the magnesium solution in the presence of one or more solvents and a surfactant. The selection of solvents and surfactants can also help control particle morphology. For instance, the proper selection of solvents and surfactants produces a solvent phase and a magnesium-titanium oil phase. Phase separation is accomplished by proper solvent and surfactant selection. Solvent selection involves considering one or more of physical property differences, such as polarity, density, and surface tension in comparison to the other ingredients in order to cause the separation between the solvent and the magnesium phase. In one aspect, the process is conducted without using toluene in that it was discovered the toluene does not promote the formation of two phases in all applications. Possible solvents that may be used include alkylbenzene compounds, hexane, heptane, or a mixture of aromatic and hydrocarbon solvents.

In one aspect, precipitation occurs in the presence of a dialkylether in combination with a surfactant. The dialkylether may be a C1 to C12 dialkylether. The surfactant, on the other hand, may be anacrylate.

Illustrative surface modifiers include, but are not limited to, polymer surfactants, such as acrylates, polyacrylates, polymethacrylates, polyalkyl methacrylates, or any other surfactant that can stabilize and emulsify. Surfactants are known in the art, and many surfactants are described in McCutcheon's "Volume I: Emulsifiers and Detergents", 2001, North American Edition, published by Manufacturing Confectioner Publishing Co., Glen Rock, N.J., and in particular, pp. 1-233 which describes a number of surfactants and is hereby incorporated by reference for the disclosure in this regard. A polyalkyl methacrylate is a polymer that may contain one or more methacrylate monomers, such as at least two different methacrylate monomers, at least three different methacrylate monomers, etc. Moreover, the acrylate and methacrylate polymers may contain monomers other than acrylate and methacrylate monomers, so long as the polymer surfactant contains at least about 40% by weight acrylate and methacrylate monomers.

Illustrative monomers that may be polymerized into polymer surfactants include one or more of acrylate; tert-butyl acrylate; n-hexyl acrylate; methacrylate; methyl methacrylate; ethyl methacrylate; propyl methacrylate; isopropyl methacrylate; n-butyl methacrylate; t-butyl methacrylate; isobutyl methacrylate; pentyl methacrylate; isoamyl methacrylate; n-hexyl methacrylate; isodecyl methacrylate; lauryl methacrylate; stearyl methacrylate; isooctyl acrylate; lauryl acrylate; stearyl acrylate; cyclohexyl acrylate; cyclohexyl methacrylate; methoxyethyl acrylate; isobenzyl acrylate; isodecyl acrylate; n-dodecyl acrylate; benzyl acrylate; isobornyl acrylate; isobornyl acrylate; isobornyl methacrylate; 2-hydroxyethyl acrylate; 2-hydroxypropyl acrylate; 2-methoxyethyl acrylate; 2-methoxybutyl acrylate; 2-(2-ethoxyethoxy)ethyl acrylate; 2-phenoxyethyl acrylate; tetrahydrofurfuryl acrylate; 2-(2-phenoxyethoxy)ethyl acrylate; methoxylated tripropylene glycol monacrylate; 1,6-hexanediol diacrylate; ethylene glycol dimethacrylate; diethylene glycol dimethacrylate; triethylene glycol dimethacrylate; polyethylene glycol dimethacrylate; butylene glycol dimethacrylate; trimethylolpropane-3-ethoxylate triacrylate; 1,4-butanediol diacrylate; 1,9-nonanediol diacrylate; neopentyl glycol diacrylate; tripropylene glycol diacrylate; tetraethylene glycol diacrylate; heptapropylene glycol diacrylate; trimethylol propane triacrylate; ethoxylated trimethylol propane triacrylate; pentaerythouritol triacrylate; trimethylolpropane trimethacrylate; tripropylene glycol diacrylate; pentaerythouritol tetraacrylate; glyceryl propoxy triacrylate; tris(acryloyloxyethyl)phosphate; 1-acryloxy-3-methacryloxy glycerol; 2-methacryloxy-N-ethyl morpholine; and allyl methacrylate, and the like.

In certain embodiments, the surface modifier is selected from poly((C1-C6) alkyl) acrylate, a poly((C1-C6) alkyl) methacrylate, and a copolymer of poly((C1-C6) alkyl) acrylate and poly((C1-C6) alkyl) methacrylate. In embodiments, a ratio of the surface modifier to halide-containing magnesium compound is from 1:10 to 2:1 wt % or from 1:5 to 1:1 wt %.

Examples of polymer surfactants that are commercially available include those under the trade designation VISCOPLEX® available from RohMax Additives, GmbH, including those having product designations 1-254, 1-256 and those under the trade designations CARBOPOL® and PEMULEN® available from Noveon/Lubrizol.

The polymer surfactant is typically added in a mixture with an organic solvent. When added as a mixture with an organic solvent, the weight ratio of surfactant to organic solvent is from about 1:20 to about 2:1. In another embodiment, the weight ratio of surfactant to organic solvent is from about 1:10 to about 1:1. In yet another embodiment, the weight ratio of surfactant to organic solvent is from about 1:4 to about 1:2.

After the foregoing halogenation procedure, the resulting solid catalyst composition is separated from the reaction medium employed in the final process, by filtering for example, to produce a moist filter cake. The moist filter cake may then be rinsed or washed with a liquid diluent to remove unreacted $TiCl_4$ and may be dried to remove residual liquid, if desired. Typically, the resultant solid catalyst composition is washed one or more times with a "wash liquid," which is a liquid hydrocarbon such as an aliphatic hydrocarbon such as isopentane, isooctane, isohexane, hexane, pentane, or octane. The solid catalyst composition then may be separated and dried or slurried in a hydrocarbon, especially a relatively heavy hydrocarbon such as mineral oil for further storage or use.

Various different types of supportive electron donors and internal electron donors may be incorporated into the solid catalyst component of the present disclosure. Examples of supportive electron donors include methyl formate; ethyl acetate; vinyl acetate; propyl acetate; octyl acetate; cyclohexyl acetate; ethyl propionate; methyl butyrate; ethyl valerate; ethyl stearate; methyl chloroacetate; ethyl dichloroacetate; methyl methacrylate; ethyl crotonate; dibutyl maleate; diethyl butylmalonate; diethyl dibutylmalonate; ethyl cyclohexanecarboxylate; diethyl 1,2-cyclohexanedicarboxylate; di-2-ethylhexyl 1,2-cyclohexanedicarboxylate; methyl benzoate; ethyl benzoate; propyl benzoate; butyl benzoate; octyl benzoate; cyclohexyl benzoate; phenyl benzoate; benzyl benzoate; methyl toluate; ethyl toluate; amyl toluate; ethyl ethylbenzoate; methyl anisate; ethyl anisate; ethyl ethoxybenzoate, γ-butyrolactone; δ-valerolactone; coumarine; phthalide; ethylene carbonate; ethyl silicate; butyl silicate; vinyltriethoxysilane; phenyltriethoxysilane; diphenyldiethoxysilane; diethyl 1,2-cyclohexanecarboxylate; diisobutyl 1,2-cyclohexanecarboxylate; diethyl tetrahydrophthalate and nadic acid; diethyl ester; diethyl naphthalenedicarboxylate; dibutyl naphthlenedicarboxylate; triethyl trimellitate and dibutyl trimellitate; 3,4-furanedicarboxylic acid esters; 1,2-diacetoxybenzene; 1-methyl-2,3-diacetoxybenzene; 2-methyl-2,3-diacetoxybenzene; 2,8-diacetoxynaphthalene; ethylene glycol dipivalate; butanediol pivalate; benzoylethyl salicylate; acetylisobutyl salicylate; acetylmethyl salicylate; diethyl adipate; diisobutyl adipate; diisopropyl sebacate; di-n-butyl sebacate; di-n-octyl sebacate; or di-2-ethylhexyl sebacate. In some embodiments, the first non-phthalate donor is methyl formate, butyl formate, ethyl acetate, vinyl acetate, propyl acetate, octyl acetate, cyclohexyl acetate, ethyl propionate, methyl butyrate, ethyl butyrate, isobutyl butyrate, ethyl valerate, ethyl stearate, methyl chloroacetate, ethyl dichloroacetate, ethyl acrylate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, ethyl p-methoxybenzoate, methyl p-methyl benzoate, ethyl p-t-butyl benzoate, ethyl naphthoate, methyl toluate, ethyl toluate, amyl toluate, ethyl benzoate, methyl anisate, ethyl anisate, or ethyl ethoxybenzoate.

In one embodiment, the supportive electron donor has the following formula:

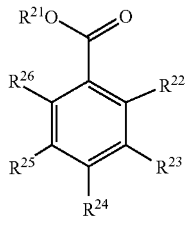

wherein $R^{21}$ is alkyl, cycloalkyl, or aryl having from 1 to 20 carbon atoms, a heteroatom, or a combination thereof; wherein each of $R^{22}$-$R^{26}$ is independently H, alkyl, cycloalkyl, or aryl having from 1 to 20 carbon atoms, heteroatom, or a combination of any two or more thereof. For example, in one embodiment, the supportive electron donor comprises ethylbenzoate.

Various different types of internal electron donors may be incorporated into the solid catalyst component. In one embodiment, the internal electron donor is an aryl diester, such as a phenylene-substituted diester. In one embodiment, the internal electron donor may have the following chemical structure:

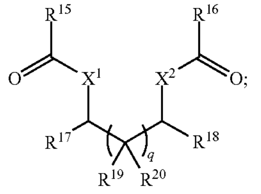

wherein: $X^1$ and $X^2$ are each O, S, or $NR^{47}$; each of $R^{15}$ through $R^{20}$ are independently H, a heteroatom, alkyl, cycloalkyl, cycloalkylalkyl, aryl, aralkyl, heterocyclyl, heterocyclylalkyl, heteroaryl, or heteroarylalkyl; and q is an integer from 0 to 12. In some embodiments, each of $R^{15}$ through $R^{20}$ are independently F, Cl, Br, I, $NR_2^{46}$, $SiR^{80}_3$, alkyl, cycloalkyl, cycloalkylalkyl, aryl, aralkyl, heterocyclyl, heterocyclylalkyl, heteroaryl, or heteroarylalkyl; q is an integer from 0 to 12, each $R^{46}$ is independently selected from H, $C_1$-$C_{20}$ alkyl, $C_6$-$C_{20}$ aryl or alkylaryl; and $R^{47}$ is H, $C_1$-$C_{20}$ alkyl, $C_6$-$C_{20}$ aryl, $C_6$-$C_{20}$ aralkyl. Each $R^{80}$ is individually alkyl, cycloalkyl, alkoxy, cycloalkylalkyl, aryl, aralkyl, heterocyclyl, heterocyclylalkyl, heteroaryl, or heteroarylalkyl.

In one embodiment, the internal electron donor may be represented by one of the following formulae:

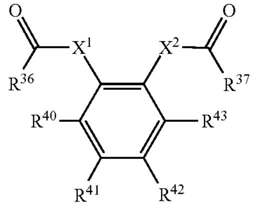

where $R^{40}$-$R^{43}$, are each independently selected from H, a heteroatom, alkyl, cycloalkyl, cycloalkylalkyl, aryl, aralkyl, alkylaryl, or an —$OR^{44}$ where $R^{44}$ is $C_1$-$C_{20}$ alkyl, $C_6$-$C_{20}$ aryl, $C_6$-$C_{20}$ aralkyl, or $C_6$-$C_{20}$ alkylaryl; $R^{36}$ and $R^{37}$ are each independently selected from F, Cl, Br, I, alkyl, cycloalkyl, cycloalkylalkyl, aryl, aralkyl, alkylaryl, —$OR^{45}$, or —$NR_2^{46}$; $R^{45}$ is $C_1$-$C_{20}$ alkyl, $C_6$-$C_{20}$ aryl, or alkylaryl; $X^1$ and $X^2$ are each O, S, or $NR^{47}$; $R^{46}$ is H, $C_1$-$C_{20}$ alkyl, $C_6$-$C_{20}$ aryl, $C_6$-$C_{20}$ aralkyl; and $R^{47}$ is H, $C_1$-$C_{20}$ alkyl, $C_6$-$C_{20}$ aryl, $C_6$-$C_{20}$ aralkyl; or

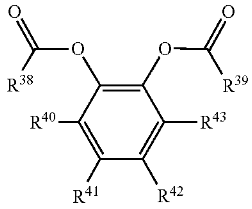

wherein: $R^{38}$, $R^{39}$, $R^{40}$, $R^{41}$, $R^{42}$, and $R^{43}$ are each independently H, a heteroatom, alkyl, cycloalkyl, cycloalkylalkyl, aryl, alkylaryl, heterocyclyl, heterocyclylalkyl, heteroaryl, or heteroarylalkyl; or

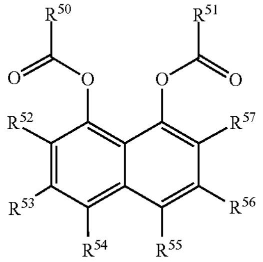

wherein: each of $R^{50}$ through $R^{57}$ are independently H, a heteroatom, alkyl, cycloalkyl, cycloalkylalkyl, aryl, aralkyl, heterocyclyl, heterocyclylalkyl, heteroaryl, or heteroarylalkyl.

In forming the solid catalyst component of the present disclosure, an organosilicon compound may be used in different ways. For example, the organosilicon compound may be used during precipitation of the catalyst support or otherwise incorporated into the catalyst support. In addition, an organosilicon compound may be contacted with the catalyst in conjunction with an activating agent.

In one embodiment, an organosilicon compound may be used and combined with the magnesium compound, the titanium compound, the supportive electron donor, and the at least one internal electron donor in forming the catalyst support. In one embodiment, the organosilicon compound is incorporated into the catalyst component in an amount such that the molar ratio of silicon to titanium is from about 0.05 to about 10, such as from about 0.1 to about 6.

In one embodiment, the organosilicon compound is represented by formula:

$$R^{40}_nSi(OR^{41})_{4-n}$$

or the organosilicon compound is a polysiloxane, or a mixture of any two or more thereof; wherein: each of $R^{40}$ and $R^{41}$ are independently a hydrocarbon, and n is $0 \leq n < 4$.

Specific examples of the organosilicon compound include, but are not limited to trimethylmethoxysilane, trimethylethoxysilane, dimethyldimethoxysilane, dimethyldiethoxysilane, diisopropyldimethoxysilane, diisobutyldimethoxysilane, t-butylmethyldimethoxysilane, t-butylmethyldiethoxysilane, t-amylmethyldiethoxysilane, dicyclopentyldimethoxysilane, diphenyldimethoxysilane, phenylmethyldimethoxysilane, diphenyldiethoxysilane, bis-o-tolydimethoxysilane, bis-m-tolydimethoxysilane, bis-p-tolydimethoxysilane, bis-p-tolydiethoxysilane, bisethylphenyldimethoxysilane, dicyclohexyldimethoxysilane, cyclohexylmethyldimethoxysilane, cyclohexylmethyldiethoxysilane, ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, γ-chloropropyltrimethoxysilane, methyltriethoxysilane, ethyltriethoxysilane, vinyltriethoxysilane, t-butyltriethoxysilane, nbutyltriethoxysilane, iso-butyltriethoxy silane, phenyltriethoxysilane, γ-amniopropyltriethoxysilane, chlorotriethoxysilane, ethyltriisopropoxysilane, vinyltributoxysilane, cyclohexyltrimethoxysilane, cyclohexyltriethoxysilane, 2-norbornanetrimethoxysilane, 2-norboranetriethoxysilane, 2-norboranemethyldimethoxysilane, ethyl silicate, butyl silicate, trimethylphenoxysilane, and methyltriallyloxysilane.

In another embodiment, the organosilicon compound is represented by Formula: $SiR^{42}R^{43}_{m}(OR^{44})_{3-m}$ wherein, $0 \le m < 3$, such as $0 \le m < 2$; and each $R^{42}$ is independently a cyclic hydrocarbon or substituted cyclic hydrocarbon. Illustrative examples of $R^{42}$, $R^{43}$, and $R^{44}$, include, but are not limited to, cyclopropyl; cyclobutyl; cyclopentyl; 2-methylcyclopentyl; 3-methylcyclopentyl; 2-ethylcyclopentyl; 3-propylcyclopentyl; 3-isopropylcyclopentyl; 3-butylcyclopentyl; 3-tertiary-butyl cyclopentyl; 2,2-dimethylcyclopentyl; 2,3-dimethylcyclopentyl; 2,5-dimethylcyclopentyl; 2,2,5-trimethylcyclopentyl; 2,3,4,5-tetramethylcyclopentyl; 2,2,5,5-tetramethylcyclopentyl; 1-cyclopentylpropyl; 1-methyl-1-cyclopentylethyl; cyclopentenyl; 2-cyclopentenyl; 3-cyclopentenyl; 2-methyl-1-cyclopentenyl; 2-methyl-3-cyclopentenyl; 3-methyl-3-cyclopentenyl; 2-ethyl-3-cyclopentenyl; 2,2-dimethyl-3-cyclopentenyl; 2,5-dimethyl-3-cyclopentenyl; 2,3,4,5-tetramethyl-3-cyclopentenyl; 2,2,5,5-tetramethyl-3-cyclopentenyl; 1,3-cyclopentadienyl; 2,4-cyclopentadienyl; 1,4-cyclopentadienyl; 2-methyl-1,3-cyclopentadienyl; 2-methyl-2,4-cyclopentadienyl; 3-methyl-2,4-cyclopentadienyl; 2-ethyl-2,4-cyclopentadienyl; 2,2-dimethyl-2,4-cyclopentadienyl; 2,3-dimethyl-2,4-cyclopentadienyl; 2,5-dimethyl-2,4-cyclopentadienyl; 2,3,4,5-tetramethyl-2,4-cyclopentadienyl; indenyl; 2-methylindenyl; 2-ethylindenyl; 2-indenyl; 1-methyl-2-indenyl; 1,3-dimethyl-2-indenyl; indanyl; 2-methylindanyl; 2-indanyl; 1,3-dimethyl-2-indanyl; 4,5,6,7-tetrahydroindenyl; 4,5,6,7-tetrahydro-2-indenyl; 4,5,6,7-tetrahydro-1-methyl-2-indenyl; 4,5,6,7-tetrahydro-1,3-dimethyl-2-indenyl; fluorenyl groups; cyclohexyl; methylcyclohexyl; ethylcylcohexyl; propylcyclohexyl; isopropylcyclohexyl; n-butylcyclohexyl; tertiary-butyl cyclohexyl; dimethylcyclohexyl; and trimethylcyclohexyl.

In the formula: $SiR^{42}R^{43}_{m}(OR^{44})_{3-m}$, $R^{43}$ and $R^{44}$ are identical or different and each represents a hydrocarbon. Furthermore, $R^{43}$ and $R^{44}$ may be bridged by an alkyl group, etc. Illustrative examples of organosilicon compounds are those in which $R^{42}$ is cyclopentyl group, $R^{43}$ is an alkyl group such as methyl or cyclopentyl group, and $R^{44}$ is an alkyl group, particularly a methyl or ethyl group.

Illustrative organosilicon compounds include, but are not limited to, trialkoxysilanes such as cyclopropyltrimethoxysilane, cyclobutyltrimethoxysilane, cyclopentyltrimethoxysilane, 2-methylcyclopentyltrimethoxysilane, 2,3-dimethylcyclopentyltrimethoxysilane, 2,5-dimethylcyclopentyltrimethoxysilane, cyclopentyltriethoxysilane, cyclopentenyltrimethoxysilane, 3-cyclopentenyltrimethoxysilane, 2,4-cyclopentadienyltrimethoxysilane, indenyltrimethoxysilane and fluorenyltrimethoxysilane; dialkoxysilanes such as dicyclopentyldimethoxysilane, bis(2-methylcyclopentyl)dimethoxysilane, bis(3-tertiary-butylcyclopentyl)dimethoxysilane, bis(2,3-dimethylcyclopentyl)dimethoxysilane, bis(2,5-dimethylcyclopentyl)dimethoxysilane, dicyclopentyldiethoxysilane, dicyclobutyldiethoxysilane, cyclopropylcyclobutyldiethoxysilane, dicyclopentenyldimethoxysilane, di(3-cyclopentenyl)dimethoxysilane, bis(2,5-dimethyl-3-cyclopentenyl)dimethoxysilane, di-2,4-cyclopentadienyl)dimethoxysilane, bis(2,5-dimethyl-2,4-cyclopentadienyl)dimethoxysilane, bis(1-methyl-1-cyclopentylethyl)dimethoxysilane, cyclopentylcyclopentenyldimethoxysilane, cyclopentylcyclopentadienyldimethoxysilane, diindenyldimethoxysilane, bis(1,3-dimethyl-2-indenyl)dimethoxysilane, cyclopentadienylindenyldimethoxysilane, difluorenyldimethoxysilane, cyclopentylfluorenyldimethoxysilane and indenylfluorenyldimethoxysilane; monoalkoxysilanes such as tricyclopentylmethoxysilane, tricyclopentenylmethoxysilane, tricyclopentadienylmethoxysilane, tricyclopentylethoxysilane, dicyclopentylmethylmethoxysilane, dicyclopentylethylmethoxysilane, dicyclopentylmethylethoxysilane, cyclopentyldimethylmethoxysilane, cyclopentyldiethylmethoxysilane, cyclopentyldimethylethoxysilane, bis(2,5-dimethylcyclopentyl)cyclopentylmethoxysilane, dicyclopentylcyclopentenylmethoxysilane, dicyclopentylcyclopentenadienylmethoxysilane and diindenylcyclopentylmethoxysilane; and ethylenebis-cyclopentyldimethoxysilane. Other illustrative organosilane compounds include polysiloxanes.

In some embodiments, once the spherical catalyst component is formed, the catalyst component may be incorporated into a catalyst system for use in various different polymerization processes in order to produce polyolefin polymers, such as polypropylene polymers and polyethylene polymers. The catalyst system can include combining the spherical catalyst component with a co-catalyst or activating agent and one or more external electron donors. The external electron donors may be activity-limiting agents and/or selectively control agents.

The activating agent may convert titanium bonds, such as titanium and chloride bonds, to titanium and carbon bonds. The titanium and carbon bonds can then serve as active sites for the initiation of a polymerization process using olefin monomers. In one embodiment, the activating agent is a hydrocarbyl aluminum compound represented by the formula $AlR^{45}_{3}$, wherein each $R^{45}$ is independently alkyl, cycloalkyl, aryl, or hydride; at least one $R^{45}$ may be a hydrocarbyl radical; two or three $R^{45}$ radicals may be joined in a cyclic radical forming a heterocyclic structure; each $R^{45}$ may be the same or different; and each $R^{45}$, which is a hydrocarbyl radical, may have 1 to 20 carbon atoms, and preferably 1 to 10 carbon atoms. In a further embodiment, each alkyl radical may be straight or branched chain and such hydrocarbyl radical may be a mixed radical, i.e., the radical can contain alkyl, aryl, and/or cycloalkyl. Non-limiting examples of suitable radicals are: methyl, ethyl, n-propyl, isopropyl, n-butyl, isobutyl, tert-butyl, n-pentyl, neopentyl, n-hexyl, 2-methylpentyl, n-heptyl, n-octyl, isooctyl, 2-ethylhexyl, 5,5-dimethylhexyl, n-nonyl, n-decyl, isodecyl, n-undecyl, and n-dodecyl.

Non-limiting examples of suitable hydrocarbyl aluminum compounds are as follows: triisobutylaluminum, tri-n-hexylaluminum, diisobutylaluminum hydride, di-n-hexylaluminum hydride, isobutylaluminum dihydride, n-hexylaluminum dihydride, diisobutylhexylaluminum, isobutyldihexylaluminum, trimethylaluminum, triethylaluminum, tri-n-propylaluminum, triisopropylaluminum, tri-n-butylaluminum, tri-n-octylaluminum, tri-n-decylaluminum, and tri-n-dodecylaluminum.

In one embodiment, triethylaluminum is used. The molar ratio of aluminum to titanium may be from about 0:1 to about 200, or from about 0.5 to about 20.

As described above, an organosilicon compound may be incorporated into the catalyst support and also used in conjunction with the activating agent. For instance, the aluminum compound as described above may be added to the catalyst component in conjunction with an organosilicon compound or may be added to the catalyst component after the organosilicon compound has been added. The organosilicon compound may be any of the organosilicon compounds described above.

In addition, the catalyst system can include an activity-limiting agent (ALA). As used herein, an "activity limiting agent" ("ALA") is a material that reduces catalyst activity at elevated temperature (i.e., temperature greater than about 85° C.). An ALA inhibits or otherwise prevents polymerization reactor upset and ensures continuity of the polymerization process. Typically, the activity of Ziegler-Natta catalysts increases as the reactor temperature rises. Ziegler-Natta catalysts also typically maintain high activity near the melting point temperature of the polymer produced. The heat generated by the exothermic polymerization reaction may cause polymer particles to form agglomerates and may ultimately lead to disruption of continuity for the polymer production process. The ALA reduces catalyst activity at elevated temperature, thereby preventing reactor upset, reducing (or preventing) particle agglomeration, and ensuring continuity of the polymerization process. The ALA may be also added to the catalyst component during the activation by alkyl aluminum compound.

The activity-limiting agent may be a carboxylic acid ester. The aliphatic carboxylic acid ester may be a C4-C30 aliphatic acid ester, may be a mono- or a poly- (two or more) ester, may be straight chain or branched, may be saturated or unsaturated, and any combination thereof. The C4-C30 aliphatic acid ester may also be substituted with one or more Group 14, 15, or 16 heteroatom containing substituents. Non-limiting examples of suitable C4-C30 aliphatic acid esters include C1-20 alkyl esters of aliphatic C4-30 monocarboxylic acids, C1-20 alkyl esters of aliphatic C8-20 monocarboxylic acids, C1-4 allyl mono- and diesters of aliphatic C4-20 monocarboxylic acids and dicarboxylic acids, C1-4 alkyl esters of aliphatic C8-20 monocarboxylic acids and dicarboxylic acids, and C4-20 mono- or polycarboxylate derivatives of C2-100 (poly)glycols or C2-100 (poly)glycol ethers. In a further embodiment, the C4-C30 aliphatic acid ester may be a laurate, a myristate, a palmitate, a stearate, an oleates, a sebacate, (poly)(alkylene glycol) mono- or diacetates, (poly)(alkylene glycol) mono- or dimyristates, (poly)(alkylene glycol) mono- or di-laurates, (poly)(alkylene glycol) mono- or di-oleates, glyceryl tri (acetate), glyceryl tri-ester of C2-40 aliphatic carboxylic acids, and mixtures thereof. In a further embodiment, the C4-C30 aliphatic ester is isopropyl myristate, di-n-butyl sebacate and/or pentyl valerate, and/or octyl acetate.

The catalyst system of the present disclosure may be used in all different types of polymerization processes. For instance, the catalyst system may be used in bulk polymerization processes and in gas phase processes. In each process, one or more olefin monomers are contacted with the catalyst system under polymerization conditions.

One or more olefin monomers may be introduced into a polymerization reactor to react with the catalyst system and to form a polymer, such as a fluidized bed of polymer particles. Non-limiting examples of suitable olefin monomers include ethylene, propylene, C4-20 α-olefins, such as 1-butene, 1-pentene, 1-hexene, 4-methyl-1-pentene, 1-heptene, 1-octene, 1-decene, 1-dodecene and the like; C4-20 diolefins, such as 1,3-butadiene, 1,3-pentadiene, norbornadiene, 5-ethylidene-2-norbornene (ENB) and dicyclopentadiene; C8-40 vinyl aromatic compounds including styrene, o-, m-, and p-methylstyrene, divinylbenzene, vinylbiphenyl, vinylnapthalene; and halogen-substituted C8-40 vinyl aromatic compounds such as chlorostyrene and fluorostyrene.

As used herein, "polymerization conditions" are temperature and pressure parameters within a polymerization reactor suitable for promoting polymerization between the catalyst composition and an olefin to form the desired polymer. The polymerization process may be a gas phase, a slurry, or a bulk polymerization process, operating in one, or more than one reactor.

In one embodiment, polymerization occurs by way of gas phase polymerization. As used herein, "gas phase polymerization" is the passage of an ascending fluidizing medium, the fluidizing medium containing one or more monomers, in the presence of a catalyst thorough a fluidized bed of polymer particles maintained in a fluidized state by the fluidizing medium. "Fluidization," "fluidized," or "fluidizing" is a gas-solid contacting process in which a bed of finely divided polymer particles is lifted and agitated by a rising stream of gas. Fluidization occurs in a bed of particulates when an upward flow of fluid thorough the interstices of the bed of particles attains a pressure differential and frictional resistance increment exceeding particulate weight. Thus, a "fluidized bed" is a plurality of polymer particles suspended in a fluidized state by a stream of a fluidizing medium. A "fluidizing medium" is one or more olefin gases, optionally a carrier gas (such as $H_2$ or $N_2$) and optionally a liquid (such as a hydrocarbon) which ascends thorough the gas-phase reactor.

A typical gas-phase polymerization reactor (or gas phase reactor) includes a vessel (i.e., the reactor), the fluidized bed, a distribution plate, inlet and outlet piping, a compressor, a cycle gas cooler or heat exchanger, and a product discharge system. The vessel includes a reaction zone and a velocity reduction zone, each of which is located above the distribution plate. The bed is located in the reaction zone. In an embodiment, the fluidizing medium includes propylene gas and at least one other gas such as an olefin and/or a carrier gas such as hydrogen or nitrogen.

In one embodiment, the contacting occurs by way of feeding the catalyst composition into a polymerization reactor and introducing the olefin into the polymerization reactor.

In addition to gas phase polymerization processes, however, it should also be understood that the catalyst system of the present disclosure can also be used in all different types of bulk phase polymerization processes.

Various types of polymers may be produced using a catalyst system of the present disclosure. For instance, the catalyst system may be used to produce polypropylene homopolymers, polypropylene copolymers, and polypropylene terpolymers. The catalyst system can also be used to produce impact resistant polymers that have elastomeric properties.

The polymers that are produced may be termed as Ziegler-Natta catalyzed polyolefins. In some embodiments, the polymers are substantially spherical, exhibiting an aspect ratio of b/l3 of greater than 0.75, a sphericity index (SPHT) of greater than 0.80, and a bulk density of greater than about 0.36 g/cc. In some embodiments, the sphericity index may be greater than 0.94. In some embodiments, the sphericity is from about 0.75 to about 0.98, or from about 0.94 to about 0.98. In some embodiments, the polymer particles have a bulk density of greater than about 0.38 g/cc. This may include a bulk density of greater than about 0.40 g/cc, greater than about 0.42 g/cc, or greater than about 0.44 g/cc. In some embodiments, the bulk density is from about 0.38 to about 0.50, or from about 0.42 to about 0.50.

In addition to polypropylene polymers, the catalyst system of the present disclosure may be used to produce polyethylene polymers, including polyethylene homopolymers, polyethylene copolymers, and the like.

As described above, the catalyst system of the present disclosure can produce various different polymers having spherical particles and relatively high bulk densities in addition to producing polymers with improved morphology.

The present invention, thus generally described, will be understood more readily by reference to the following examples, which are provided by way of illustration and are not intended to be limiting of the present invention.

EXAMPLES

The following parameters are defined as follows.

Catalyst particle morphology is indicative of the polymer particle morphology produced therefrom. The three parameters of polymer particle morphology (sphericity, symmetry and aspect ratio) may be determined using a Camsizer instrument. Camsizer Characteristics:

Sphericity SPHT=$(4\pi A)/P^2$=Cirularity2 (ISO 9276-6)

where:

P is the measured perimeter/circumference of a particle projection; and A is the measured area covered by a particle projection.

For an ideal sphere, SPHT is defined as 1. Otherwise, the value is less than 1.

The symmetry is defined as:

$$Symm_{0,3}=0.5(1+\min(r_1/r_2)$$

where, $r^1$ and $r^2$ are distance from the center of area to the borders in the measuring direction. For asymmetric particles Symm is less than 1. If the center of the area is outside the particle, i.e. $r_1/r_2<0$, the Symm is less than 0.5.

$X_{Ma}=r_1+r_2$, or "Symm," is the minimum value of the measured set of symmetry values from different directions.

Aspect ratio is given by the following equation:

$$B/L_{0,2,3}=\frac{x_{c\ min}}{x_{Fe\ max}}$$

where $x_c$ min and $X_{Fe}$ max out of the measured set of $x_c$ and $X_{Fe}$ values. Feret diameter xFe: Distance between two tangents placed perpendicular to the measuring direction. For a convex particle the mean Feret diameter (mean value of all directions) is equal to the diameter of a circle with the same circumference. xFe max the longest Feret diameter out of the measured set of Feret diameters. The catalyst morphology characteristics such as aspect ratio ("B/L3") may be used for characterization of polymer morphology.

$D_{10}$ represents the size of particles (diameter), wherein 10% of particles are less than that size, $D_{50}$ represents the size of particles, wherein 50% of particles are less than that size, and $D_{90}$ represents the size of particles, wherein 90% of particles are less than that size. The "span" is the distribution of the particle sizes of the particles. The value may be calculated according to the following formula:

$$Span=(D_{90}-D_{10})/D_{50}$$

"PP" prior to any D or Span value indicates the D value or Span value for polypropylene prepared using the catalysts indicated.

BD is an abbreviation for bulk density, and is reported in units of g/ml.

CE is an abbreviation for catalyst efficiency and is reported in units of Kg polymer per gram of catalyst (Kg/g) during the polymerization for 1 hour.

MFR is an abbreviation for melt flow rate and is reported in units of g/10 min. The MFR is measured cording to ASTM Test D1238 T.

The catalyst component particle size analysis was conducted using laser light scattering method by Malvern Mastersizer 3000 instrument. Toluene is used as a solvent.

ID is an abbreviation for internal electron donor.

EB is an abbreviation for ethyl benzoate.

TEOS is an abbreviation for tetraethylorthosilicate.

Syltherm® is a polydimethylsiloxane/silicone polymer-based liquid that is commercially available from Dow Chemical.

Ti, Mg, and D are the weight percentages (wt %) for each of the titanium, magnesium, and internal donor, respectively, in the composition.

XS is an abbreviation for xylene solubles and is reported in units of wt %, which represents the isotacticity of a catalyst.

Various different catalyst components were produced according to the present disclosure and tested for various properties. In each example below, the internal electron donor (ID) used was a catechol dibenzoate as described in paragraph 52 of U.S. Patent Publication No. US 2013/0261273, which is incorporated herein by reference.

Example 1. Comparative without the supportive donor. 12.0 g $MgCl_2$, 49.4 g 2-ethyhexanol, and 81.6 g of heptane were charged to the reactor and mixed at 25° C. at 600 rpm. The temperature was ramped from 25° C. to 120° C. at 600 rpm, and held at a temperature of at 120° C. and 600 rpm until the $MgCl_2$ dissolved completely after 2.5 hours. The solution was cooled to 60° C. and 11.06 g dibutyl ether was added. The temperature was held at 60° C. for 15 minutes. The composition was cooled, and 6.8 g of Viscoplex surfactant was added to the mixture in 14.9 g of heptane. 5.5 g TEOS in 14.2 g of heptane was added to the mixture. The mixture was cooled to −25° C. 260 g of $TiCl_4$ was added over 1.5 hours. The temperature was ramped and increased to 50° C. and held for 30 minutes. The temperature was then to 90° C. and held for 30 minutes. The composition was filtered and the filtrate washed with 200 ml of toluene at 90° C. for 10 minutes. 265 ml toluene was added and the mixture was agitated at 400 rpm. 3.0 g of internal electron donor ("ID") with 5 g toluene was added at 40° C. and mixed at 400 rpm for 1 hour. The mixture was filtered and 265 ml of 10% $TiCl_4$/toluene was added. The mixture was mixed at 400 rpm and at 105° C. for 1 hour. The mixture was filtered. 265 ml of a 10% $TiCl_4$/toluene was added and the mixture was mixed at 400 rpm and at 110° C. for 30 minutes and filtered. 265 ml of a 10% $TiCl_4$/toluene was added and the mixture was mixed at 400 rpm and at 110° C. for 30 minutes and filtered. 265 ml of a 10% $TiCl_4$/toluene was added at 110° C., followed by mixing and filtration. The solid was washed with 200 ml of hexane at 65° C. and agitated for 10 minutes. The product was discharged as a hexane slurry.

When used in polymerizations, the obtained catalyst demonstrates a low catalyst activity (26.8 kg/g), high XS (4.51%; i.e. low isotacticity), and low bulk density of the polymer that is produced.

Example 2. Example 1 was repeated. However, ethyl benzoate was added prior to the $TiCl_4$ addition. This example demonstrates the effect of ethyl benzoate on the catalyst activity, catalysts isotacticity. The catalyst activity increased from 26.8 kg/g to 56.2 kg/g. The XS of the polymer reduced from 4.51% to 1.28%. The internal electron donor incorporation was increased. The catalyst component contained 15.3% by weight internal electron donor when supportive donor was used in comparison with 6.9% by weight internal electron donor in Example 1.

Example 3. Example 2 was repeated. However, 8.0 g of Viscoplex surfactant was used and ethyl benzoate was added after $TiCl_4$ addition. This example demonstrates high internal electron donor incorporation, high catalyst activity (80 kg/g) and a polymer was produced with high bulk density and high isotacticity.

Example 4. Comparative without the supportive donor. Example 1 was repeated. However, 8.0 g of Viscoplex surfactant was used. Isoamyl ether (14.5 g) was added. The catalyst activity is slightly increased but the catalyst isotacticity is reduced in comparison with example 1 (XS=5.35%).

Example 5. Example 4 was repeated. However, 11.0 g of isoamyl ether was used and ethyl benzoate (5.0 g) was added after $TiCl_4$ was added at 25° C. Example 5 demonstrates the effect of ethyl benzoate in combination with isoamyl ether on the catalyst component composition and catalyst performance.

Example 6. Example 4 was repeated. However, the amount of TEOS (3.0 g) and Viscoplex surfactant (5.0 g) and ethyl benzoate (4.0 g) were varied.

Example 7. Example 7 demonstrates the catalyst component preparation using Syltherm surfactant. The catalyst component was tested in an ethylene polymerization process producing polyethylene with a high bulk density. 12.0 g $MgCl_2$, 0.8 g of $Al(OPr^i)_3$ ($Pr^i$ is an abbreviation for isopropyl), 49.4 g 2-ethyhexanol, Syltherm surfactant (2.5 g) and 80 g of heptane was charged to a reactor. The solution was heated and agitated (600 rpm) at 120° C. until $MgCl_2$ was dissolved completely (3.5 hours). The solution was cooled to 60° C. and 14.5 g of isoamyl ether was added and the solution was held at 60° C. for 30 minutes. The solution was cooled to room temperature. 6.0 g of Viscoplex surfactant was added in 20 g of heptane. The solution was cooled to −20° C. The agitation speed based on the viscosity of the mixture was set to 800 rpm. 260 g of $TiCl_4$ was added at −20° C. over 1.0 hour. The temperature was ramped to 50° C. At 25° C., 5.0 g of EB was added. The mixture was held for 30 minutes at 50° C. The temperature was then ramped up to 90° C. and held for 30 minutes. The mixture was filtered and washed with 200 ml of toluene at 90° C. for 10 minutes. The mixture was filtered. $TiCl_4$/hexane (152 g of $TiCl_4$ and 60 g of hexane) was added to the reactor and heated at 100° C. for 1 hour. The mixture was filtered and washed with 200 ml hexane at 65° C. and agitated for 10 min. The product was collected as a hexane slurry.

Example 8. Example 8 demonstrates the catalyst component preparation with two silicon compounds: Syltherm surfactant and TEOS. The catalyst showed high catalyst activity and produced a polymer with high bulk density. The following mixture was prepared: $MgCl_2$ (12.0 g), aluminum isopropoxide (0.8 g), $MgCl_2$ (12.0 g), heptane (100 g), Syltherm XLT surfactant (2.5 g), and 2-ethyl-hexanol (50 g). The mixture was heated to 120° C. for 3.5 hours. The solution was cooled to 60° C. and 14.5 g of isoamyl ether was added and the solution was held at 60° C. for 30 minutes. The solution was cooled to room temperature. TEOS (2.0 g in 10 g of heptane) and 5.0 g of Viscoplex surfactant in 20 g of heptane was added. The solution was cooled to −20° C. The solution was agitated at 600 rpm. 260 g of $TiCl_4$ was added at −20° C. in over 1.0 hour. The mixture was agitated during $TiCl_4$ addition at 700 rpm. The temperature was ramped up to 50° C. At 10° C., 5.0 g EB in 5 g of heptane was added and the composition was heated to 50° C. and held there for 30 minutes. The composition was heated to 90° C. and held there for 30 minutes and filtered. The solid was washed with 200 ml of toluene at 90° C. for 10 minutes. 265 ml of 10% $TiCl_4$/toluene was added. The mixture was mixed at 400 rpm and at 105° C. for 1 hour. 3.0 g of ID with 5 g toluene was added at 40° C. during heating. The mixture was filtered. 265 ml of a 10% $TiCl_4$/toluene was added and the mixture was mixed at 400 rpm and at 110° C. for 30 minutes and filtered. 265 ml of a 10% $TiCl_4$/toluene was added and the mixture was mixed at 400 rpm and at 110° C. for 30 minutes and filtered. The solid was washed with 200 ml of hexane at 65° C. and agitated for 10 minutes. The product was discharged as a hexane slurry.

Example 9. Example 9 demonstrates preparation of a high activity catalyst component that produces a polymer with high bulk density (0.47 g/cc) and high sphericity (B/L3=0.89). 12.0 g $MgCl_2$ (Toho), 49.4 g 2-ethyhexanol and 80 g of heptane were combined at 25° C. and agitated at 600 rpm. The temperature was ramped from 25° C. to 120° C. at 600 rpm. The solution was held at 120° C. and at 600 rpm until the $MgCl_2$ dissolved completely (about 5.0 hours). The solution was cooled to 25° C. under a nitrogen atmosphere. The temperature was ramped to 60° C. and 11.0 g isoamyl ether was added. The solution was held at 60° C. for 15.0 minutes and then cooled to room temperature. TEOS (3.0 g in 10 g of heptane) was added and a mixture of 5.0 g of Viscoplex surfactant in 15.0 g of heptane was added. The composition was cooled to −20° C. and agitated at 600 rpm. 260 g of $TiCl_4$ was added at −20° C. in over 1.0 hour. The composition was heated to 50° C. and EB (4.0 g in in 5 ml of heptane) was added. The composition was held at 50° C. for 30 minutes. The temperature was ramped to 90° C. and held for 60 minutes. The composition was filtered and washed with 200 ml of toluene at 90° C. for 10 minutes. 265 ml of 10% $TiCl_4$/toluene was added and the composition was agitated at 400 rpm. 3.0 g of ID with 5 g toluene was added at 40° C. The temperature was held at 85° C. for 1 hour at 400 rpm and then filtered. 265 ml of 10% $TiCl_4$/toluene was added. The mixture was mixed at 400 rpm and at 105° C. for 1 hour. The mixture was filtered. 265 ml of a 10% $TiCl_4$/toluene was added and the mixture was mixed at 400 rpm and at 110° C. for 30 minutes and filtered. 265 ml of a 10% $TiCl_4$/toluene was added and the mixture was mixed at 400 rpm and at 110° C. for 30 minutes and filtered. The solid was washed with 200 ml of hexane at 65° C. and agitated for 10 minutes. The product was discharged as a hexane slurry.

Each of the catalyst components described above in Examples 1-9 were used to produce polypropylene polymers.

To produce the polypropylene polymers, a bulk phase polymerization process was utilized. More particularly, catalysts of the examples were used in a method of propylene polymerization. The following method was used.

The reactor was baked at 100° C. under nitrogen flow for 30 minutes prior to the polymerization run. The reactor was cooled to 30-35° C. and co-catalyst (1.5 ml of 25 wt % triethylaluminum (TEAL)), C-donor (cyclohexylmethydimethoxysilane) (1 ml), hydrogen (5 standard liters, "SL"). liquid propylene (1500 ml) were added in this sequence into the reactor. The catalyst (5-10 mg), loaded as a mineral oil slurry, was pushed into the reactors using high pressure nitrogen. The polymerization was performed for one hour at 70° C. After the polymerization, the reactors were cooled to 22° C., vented to atmospheric pressure, and the polymer collected.

Tables 1 and 2 below illustrate the properties of the catalyst component made according to the present disclosure and the properties of polypropylene polymers made using the catalyst component.

TABLE 1

Catalyst component composition.

| Example | D50 (μm) | Span | Ti (%) | Mg (%) | EB (%) | ID (%) |
|---|---|---|---|---|---|---|
| 1 (comparative) | 85 | | 2.46 | 17.82 | 0 | 6.9 |
| 2 | 73.3 | 0.821 | 2.41 | 16.8 | n/a | 15.3 |
| 3 | 47.9 | 0.915 | 2.84 | 16.33 | 0.5 | 15.0 |
| 4 (comparative) | 31.5 | 1.380 | 4.12 | 15.44 | n/a | 9.0 |
| 5 | 22.5 | 1.639 | 2.79 | 16.48 | 1.2 | 12.8 |
| 6 | 47.1 | 1.344 | 2.97 | 14.91 | 1.4 | 15.5 |
| 7 | 16.5 | 1.165 | 3.61 | 17.30 | 10.5 | 0 |
| 8 | 16.1 | 2.341 | 2.78 | 16.7 | 2.6 | 12.3 |
| 9 | 27.3 | 1.099 | 2.72 | 17.36 | 4.8 | 14.9 |

TABLE 2

Bulk propylene polymerization data.

| Catalyst Example # | CE (kg/g) | MFR (g/10 min) | BD (g/cc) | XS (%) | PP D50 (μm) | span | SPHT3 | Symm3 | b/l3 |
|---|---|---|---|---|---|---|---|---|---|
| 1 (comparative) | 26.8 | 18.64 | 0.352 | 4.51 | 2533 | 0.508 | 0.935 | 0.931 | 0.846 |
| 2 | 56.2 | 8.0 | 0.172 | 1.28 | 2838 | 0.982 | 0.845 | 0.898 | 0.778 |
| 3 | 80.4 | 3.6 | 0.360 | 1.47 | 2334 | 0.573 | 0.866 | 0.892 | 0.784 |
| 4 | 56.6 | 8.5 | 0.380 | 5.35 | 1367 | 0.893 | 0.799 | 0.864 | 0.730 |
| 5 | 107.4 | 0.6 | 0.416 | 1.84 | 856 | 1.698 | 0.852 | 0.886 | 0.771 |
| 6 | 146.8 | 0.8 | 0.390 | 2.59 | 1824 | 1.276 | n/a | n/a | 0.778 |
| 8 | 81.2 | 1.1 | 0.447 | 2.12 | 409 | 3.09 | 0.847 | 0.885 | 0.781 |
| 9 | 103.8 | 0.6 | 0.451 | 1.43 | 1222 | 0.936 | 0.949 | 0.940 | 0.884 |

Figure 2:
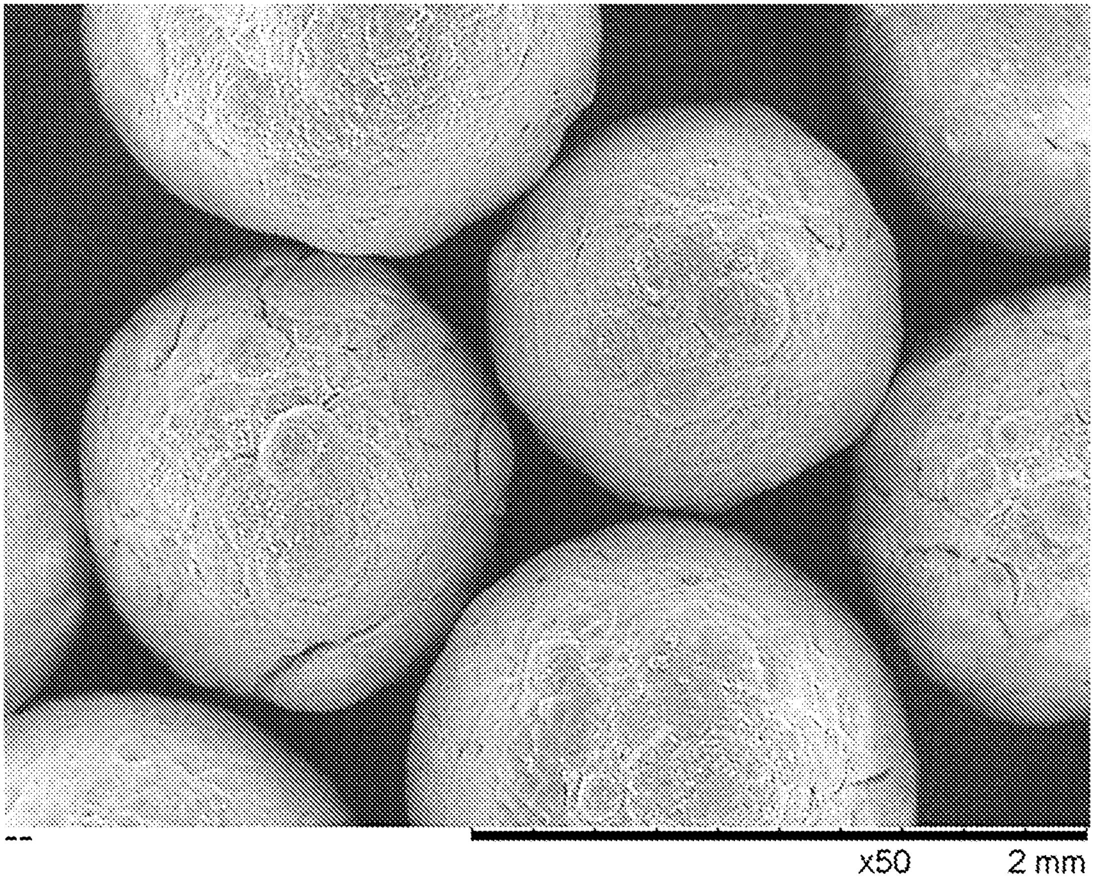
FIG. 2 is an SEM image of polypropylene particles produced in Example 9.

Referring to FIGS. 1 and 2, SEM (scanning electron microscope) images are provided illustrating the polypropylene particles from Example 9 above. As shown, the polypropylene particles are substantially spherical.

In Examples 10-12 below, polypropylene polymers were produced using the catalyst component from Example 3 above. In Examples 10-12, the amount of hydrogen was varied. The following data below shows a high hydrogen response in relation to melt flow rate.

TABLE 3

Propylene polymerization with different hydrogen amount (catalyst from example 3).

| Example | H2 (SL) | CE kg/g | B/D, g/cc | MFR, g/10 min | XS, % | PP D-50 microns | Span | SPHT3 | Symm3 | b/l3 |
|---|---|---|---|---|---|---|---|---|---|---|
| 10 | 10 | 79.8 | 0.383 | 13.4 | 1.93 | 2284 | 0.531 | 0.934 | 0.929 | 0.828 |
| 11 | 20 | 76.6 | 0.378 | 76.0 | 2.40 | 2362 | 0.416 | 0.938 | 0.933 | 0.830 |
| 12 | 30 | 83.6 | 0.395 | 507.6 | 2.86 | 2334 | 10.424 | 0.941 | 0.934 | 0.839 |

Examples 13-17 are further examples of polypropylene polymers made using the catalyst component from Example 9 above. Again, the amount of hydrogen was varied illustrating a high hydrogen response in relation to melt flow rate.

TABLE 4

Propylene polymerization with different hydrogen amount (catalyst from example 9).

| Example | H2 (SL) | CE kg/g | B/D, g/cc | MFR, g/10 min | XS, % | PP D-50 microns | Span | SPHT3 | Symm3 | b/l3 |
|---|---|---|---|---|---|---|---|---|---|---|
| 13 | 10 | 114.0 | 0.472 | 7.3 | 2.22 | 1121 | 1.105 | 0.945 | 0.941 | 0.886 |
| 14 | 15 | 130.0 | 0.470 | 17.2 | 2.63 | 1377 | 0.811 | 0.959 | 0.946 | 0.896 |
| 15 | 20 | 128.3 | 0.473 | 54.4 | 2.93 | 1338 | 0.945 | n/a | n/a | 0.895 |
| 16 | 30 | 126.8 | 0.480 | 218.5 | 3.13 | 1442 | 0.781 | 0.960 | 0.946 | 0.898 |
| 17 | 35 | 111.5 | 0.473 | 476.8 | 3.28 | 1534 | 0.598 | 0.963 | 0.945 | 0.895 |

In Examples 18 and 19 (Table 5), the catalyst component produced in Example 7 above was used in forming a polyethylene polymer. The polyethylene polymers were formed using different amounts of hydrogen.

TABLE 5

Ethylene polymerization with catalyst from example 7.

| Example | $H_2$ (SL) | CE, kg/g | B/D, g/cc | MI | MI10 | HLMI | Ratio | PP D50 (μm) | Span | SPHT3 | Symm3 | b/l3 |
|---|---|---|---|---|---|---|---|---|---|---|---|---|
| 18 | 6 | 15.8 | 0.334 | 1.7 | 17.1 | 65.1 | 37.53 | 438 | 1.310 | 0.759 | 0.849 | 0.703 |
| 19 | 30 | 13.5 | 0.359 | 50.9 | 436.2 | 511.6 | 10.04 | 355 | 1.510 | 0.823 | 0.871 | 0.733 |

Figure 3:
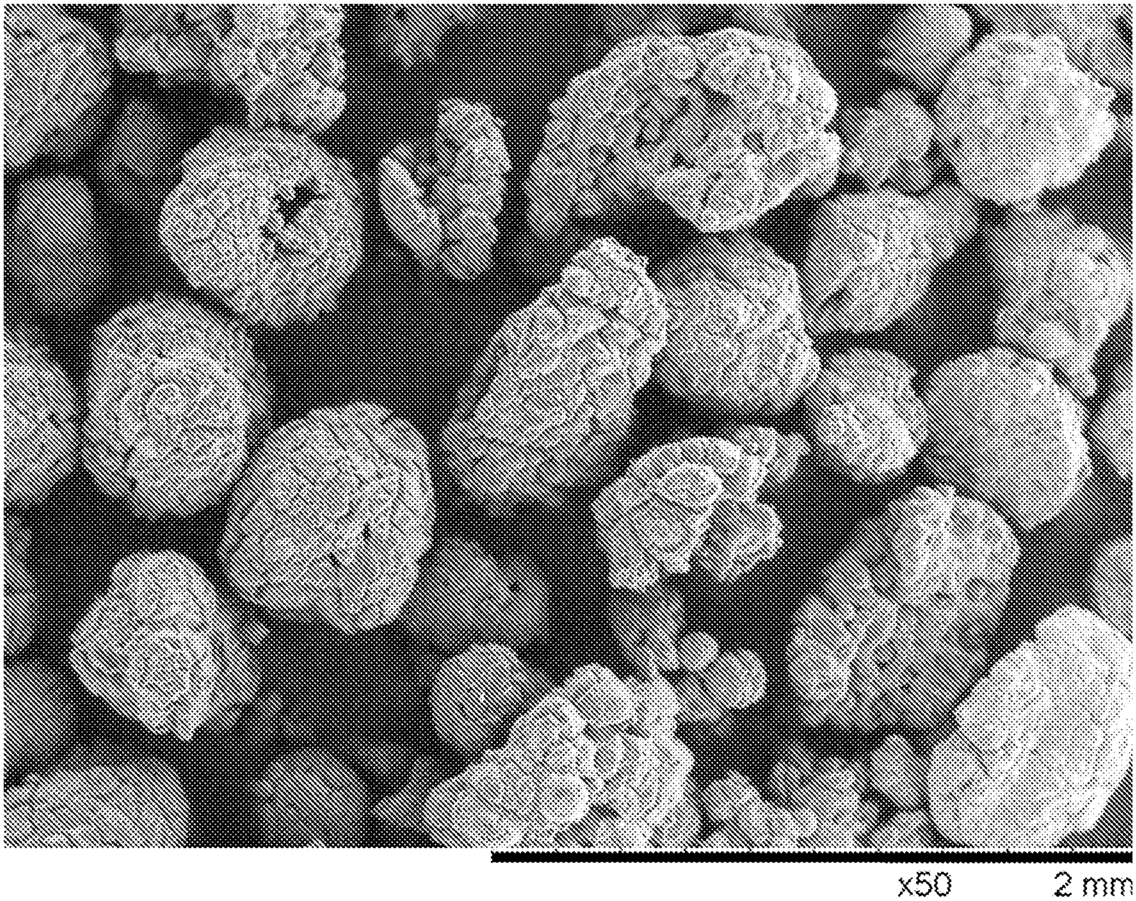
FIG. 3 is an SEM image of polyethylene particles produced in Example 7.

FIG. 3 is an SEM image of the polyethylene particles made according to Example 18.

While certain embodiments have been illustrated and described, it should be understood that changes and modifications may be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations may be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions, or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range may be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like, include the number recited and refer to ranges which may be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A process of producing a spherical catalyst component for use in producing polyolefin polymers, the process comprising:

a) dissolving a magnesium halide compound in a solvent to form a homogeneous solution, the solvent comprising an alcohol;

b) treating the homogeneous solution with a first titanium compound in the presence of a surfactant, a supportive electron donor, and optionally a first internal electron donor to form a solid precipitate;

c) treating the solid precipitate with a second titanium compound in the presence a second internal electron donor to form a spherical catalyst component including a magnesium halide compound base incorporating a titanium unit, the supportive electron donor, the second internal electron donor, and optionally the first electron donor; and wherein the spherical catalyst component comprises particles having a substantially spherical shape and exhibiting a D50 from about 3 μm to about 150 μm.

2. The process of claim 1, wherein the first and the second titanium compounds are the same or different and are represented as formula:

$Ti(OR^{29})_g X^3_{4-g}$;

wherein:

each $R^{29}$ is independently a $C_1$-$C_{20}$ alkyl, $C_3$-$C_{20}$ cycloalkyl, or $C_6$-$C_{30}$ aryl;

$X^3$ is Br, Cl, or I; and g is 0, 1, 2, 3, or 4.

3. The process of claim 1, where in the magnesium halide compound is a compound of formula $Mg(OR^{30})_n Cl_{2-n}$, wherein $R^{30}$ is alkyl or haloalkyl, and n is 0 or 1.

4. The process of claim 3, wherein in the magnesium halide compound is magnesium dichloride.

5. The process of claim 1, wherein the supportive electron donor comprises an aryl ester.

6. The process of claim 1, wherein the supportive electron donor is represented as formula:

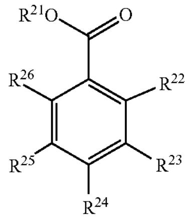

wherein:

$R^{21}$ is alkyl, cycloalkyl, or aryl having from 1 to 20 carbon atoms, a heteroatom, or a combination thereof;

each of $R^{22}$-$R^{26}$ is independently H, alkyl, cycloalkyl, or aryl having from 1 to 20 carbon atoms, heteroatom, or a combination of any two or more thereof.

7. The process of claim 1, wherein the supportive electron donor comprises an alkylbenzoate.

8. The process of claim 1, wherein the supportive electron donor comprises ethylbenzoate.

9. The process of claim 1, wherein the supportive electron donor is present in the spherical catalyst component from about 0.1 wt % to about 15 wt %.

10. The process of claim 1, wherein the first and second internal electron donors are independently represented as:

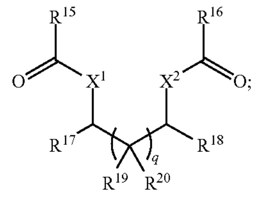

wherein:

$X^1$ and $X^2$ are each O, S, or $NR^{47}$, each of $R^{15}$ through $R^{20}$ are independently H, a heteroatom, alkyl, cycloalkyl, cycloalkylalkyl, aryl, aralkyl, heterocyclyl, heterocyclylalkyl, heteroaryl, or heteroarylalkyl; and q is an integer from 0 to 12, In some embodiments, each of $R^{15}$ through $R^{20}$ are independently F, Cl, Br, I, $NR_2^{46}$, $SiR^{80}_3$, alkyl, cycloalkyl, cycloalkylalkyl, aryl, aralkyl, heterocyclyl, heterocyclylalkyl, heteroaryl, or heteroarylalkyl; q is an integer from 0 to 12;

each $R^{46}$ is independently selected from H, $C_1$-$C_{20}$ alkyl, $C_6$-$C_{20}$ aryl or alkylaryl;

$R^{47}$ is H, $C_1$-$C_{20}$ alkyl, $C_6$-$C_{20}$ aryl, $C_6$-$C_{20}$ aralkyl;

each $R^{80}$ is individually alkyl, cycloalkyl, alkoxy, cycloalkylalkyl, aryl, aralkyl, heterocyclyl, heterocyclylalkyl, heteroaryl, or heteroarylalkyl; and q is an integer from 0 to 12.

11. The process of claim 1, wherein the first and second internal electron donors are independently represented as:

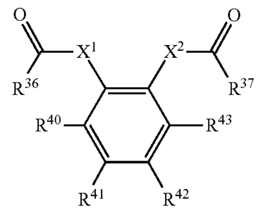

wherein:

$X^1$ and $X^2$ are each O, S, or $NR^{47}$, $R^{36}$ and $R^{37}$ are each independently selected from F, Cl, Br, I, alkyl, cycloalkyl, cycloalkylalkyl, aryl, aralkyl, alkylaryl, —$OR^{45}$, or —$NR_2^{46}$;

$R^{40}$, $R^{41}$, $R^{42}$, and $R^{43}$ are each independently H, a heteroatom, alkyl, cycloalkyl, cycloalkylalkyl, aryl, alkylaryl, heterocyclyl, heterocyclylalkyl, heteroaryl, heteroarylalkyl, or an —$OR^{44}$, $R^{44}$ is $C_1$-$C_{20}$ alkyl, $C_6$-$C_{30}$ aryl, $C_6$-$C_{30}$ aralkyl, or $C_6$-$C_{30}$ alkylaryl;

$R^{45}$ is $C_1$-$C_{20}$ alkyl, $C_6$-$C_{20}$ aryl, or alkylaryl;

$R^{46}$ is H, $C_1$-$C_{20}$ alkyl, $C_6$-$C_{20}$ aryl, $C_6$-$C_{20}$ aralkyl; and $R^{47}$ is H, $C_1$-$C_{20}$ alkyl, $C_6$-$C_{20}$ aryl, $C_6$-$C_{20}$ aralkyl.

12. The process of claim 1, wherein the first and second internal electron donors are independently represented by one of the following formulae:

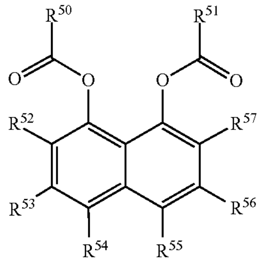

wherein:

$R^{50}$, $R^{51}$, $R^{52}$, $R^{53}$, $R^{54}$, $R^{55}$, $R^{56}$, and $R^{57}$ are independently H, a heteroatom, alkyl, cycloalkyl, cycloalkylalkyl, aryl, aralkyl, heterocyclyl, heterocyclylalkyl, heteroaryl, or heteroarylalkyl.

13. The process of claim 1, wherein the alcohol comprises a $C_1$-$C_{20}$ alcohol.

14. The process of claim 1, wherein the surfactant comprises an acrylate or a polyacrylate.

15. The process of claim 1, wherein treating the homogenous solution further comprises adding a di-($C_1$-$C_{12}$)-alkylether.

16. The process of claim 1 further comprising adding an organosilicon compound containing Si—O groups, O—Si—O groups, or both.

17. A spherical catalyst component produced according to claim 1.

18. A catalyst system for use in olefinic polymerization, comprising the spherical catalyst component of claim 17, an organoaluminium compound.

19. A process for polymerizing or copolymerizing an olefinic monomer, the process comprising contacting an olefinic monomer with the catalyst system of claim 18 to form a polyolefin.

20. A polymer composition comprising polyolefin particles comprising a polyolefin prepared in the presence of the spherical catalyst component of claim 17, the polyolefin particles exhibiting an aspect ratio of b/l3 of greater than 0.75, a sphericity index (SPHT) of greater than 0.80, and a bulk density of greater than about 0.36 g/cc.

* * * * *